US012562119B2

(12) United States Patent
Xu et al.

(10) Patent No.: US 12,562,119 B2
(45) Date of Patent: Feb. 24, 2026

(54) PIXEL CIRCUIT AND DRIVING METHOD THEREOF, AND DISPLAY DEVICE

(71) Applicant: CHENGDU VISTAR OPTOELECTRONICS CO., LTD., Sichuan (CN)

(72) Inventors: Shangjun Xu, Chengdu (CN); Xiuqi Huang, Chengdu (CN); Shan Gao, Chengdu (CN); Baohong Wan, Chengdu (CN); Yang Li, Chengdu (CN); Zhenli Song, Chengdu (CN)

(73) Assignee: Chengdu Vistar Optoelectronics Co., Ltd., Chengdu (CN)

( * ) Notice: Subject to any disclaimer, the term of this patent is extended or adjusted under 35 U.S.C. 154(b) by 0 days.

(21) Appl. No.: 18/915,554

(22) Filed: Oct. 15, 2024

(65) Prior Publication Data

US 2025/0037659 A1 Jan. 30, 2025

Related U.S. Application Data

(63) Continuation of application No. PCT/CN2023/087953, filed on Apr. 13, 2023.

(30) Foreign Application Priority Data

May 30, 2022 (CN) ........................ 202210614763.X

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2300/0861;
(Continued)

(56) References Cited

U.S. PATENT DOCUMENTS

2018/0240400 A1 8/2018 Zhou et al.
2020/0273411 A1* 8/2020 Gao .................... G09G 3/3233
(Continued)

FOREIGN PATENT DOCUMENTS

CN 111028776 A 4/2020
CN 113168808 A 7/2021
(Continued)

OTHER PUBLICATIONS

Office Action issued on Jan. 17, 2024, in corresponding Taiwanese Application No. 112114644, 16 pages.
(Continued)

*Primary Examiner* — Tom V Sheng
(74) *Attorney, Agent, or Firm* — Maier & Maier, PLLC

(57) ABSTRACT

A pixel circuit, a driving method thereof, and a display device. The pixel circuit includes a light emission time control circuit, a current control circuit, and a light emission circuit. The light emission time control circuit includes a first drive circuit, a coupling circuit, and a first voltage write circuit. The first voltage write circuit is configured to transmit a fixed voltage to a control terminal of the first drive circuit. The coupling circuit is connected to the control terminal of the first drive circuit. A first terminal of the first drive circuit outputs a control voltage to a control terminal of the current control circuit. An output of the current control circuit is connected to the light emission circuit.

19 Claims, 17 Drawing Sheets

(52) U.S. Cl.
CPC ............... *G09G 2300/0861* (2013.01); *G09G 2310/061* (2013.01); *G09G 2310/066* (2013.01); *G09G 2320/0242* (2013.01); *G09G 2320/0252* (2013.01); *G09G 2320/0257* (2013.01)

(58) Field of Classification Search
CPC ....... G09G 2310/061; G09G 2310/066; G09G 2320/0242; G09G 2320/0252; G09G 2320/0257
USPC .......................................................... 345/208
See application file for complete search history.

(56) References Cited

U.S. PATENT DOCUMENTS

| | | | | |
|---|---|---|---|---|
| 2021/0210002 | A1 | 7/2021 | Kim et al. | |
| 2021/0407384 | A1* | 12/2021 | Yuan | G09G 3/32 |
| 2022/0101776 | A1 | 3/2022 | Wu et al. | |
| 2022/0101783 | A1* | 3/2022 | Han | G09G 3/32 |
| 2022/0165214 | A1* | 5/2022 | Liu | G09G 3/3233 |
| 2022/0215796 | A1* | 7/2022 | Zhai | G09G 3/32 |
| 2022/0246088 | A1* | 8/2022 | Zhai | G09G 3/32 |
| 2022/0330401 | A1* | 10/2022 | Hashimoto | G09G 3/3233 |
| 2023/0079903 | A1* | 3/2023 | Xie | G09G 3/3233 345/690 |
| 2023/0120265 | A1* | 4/2023 | Hashimoto | G09G 3/2011 345/214 |
| 2023/0230957 | A1* | 7/2023 | Kim | H10D 86/423 345/690 |
| 2023/0238398 | A1* | 7/2023 | Choi | H10D 86/60 |
| 2024/0038170 | A1* | 2/2024 | Zhai | G09G 3/3233 |
| 2024/0257728 | A1* | 8/2024 | Han | G09G 3/32 |
| 2025/0037660 | A1* | 1/2025 | Liao | G09G 3/3233 |

FOREIGN PATENT DOCUMENTS

| | | | |
|---|---|---|---|
| CN | 113396452 | A | 9/2021 |
| CN | 113487996 | A | 10/2021 |
| CN | 113707077 | A | 11/2021 |
| CN | 113808543 | A | 12/2021 |
| CN | 114299864 | A | 4/2022 |
| CN | 114446251 | A | 5/2022 |
| EP | 3389039 | A1 | 10/2018 |
| KR | 102362145 | B1 | 2/2022 |
| TW | 202015020 | A | 4/2020 |
| WO | 2019/231074 | A1 | 12/2019 |
| WO | 2020/233024 | A1 | 11/2020 |

OTHER PUBLICATIONS

Office Action issued on Jan. 24, 2025, in corresponding Chinese Application No. 202210614763.X, 33 pages.
International Search Report issued on Sep. 7, 2023, in corresponding International Application No. PCT/CN2023/087953, 6 pages.

* cited by examiner

PIXEL CIRCUIT AND DRIVING METHOD THEREOF, AND DISPLAY DEVICE

CROSS-REFERENCE TO RELATED APPLICATION

This is a continuation of International Patent Application No. PCT/CN2023/087953, filed on Apr. 13, 2023, which is based on and claims priority to Chinese Patent Application No. 202210614763.X filed with the China National Intellectual Property Administration (CNIPA) on May 30, 2022, disclosures of which are incorporated herein by reference in their entireties.

TECHNICAL FIELD

The present application relates to the field of display technology, for example, a pixel circuit, a driving method thereof, and a display device.

BACKGROUND

With the development of display technology, light-emitting diodes (LEDs) are widely applied in the display field due to the advantages of a wide color gamut, fast response speed, high brightness, and long lifetime.

At present, an LED display panel usually includes pixel circuits and light-emitting elements. The pixel circuits are used for driving the light-emitting elements to emit light. However, external power signals of a pixel circuit in the related art are complex, resulting in a large voltage span of the pixel voltage and reducing the reliability of the pixel circuit.

SUMMARY

The present application provides a pixel circuit, a driving method thereof, and a display device to reduce voltage span of the pixel voltage and improve the reliability of the pixel circuit.

According to an aspect of the present application, a pixel circuit is provided. The pixel circuit includes a light emission time control circuit, a current control circuit, and a light emission circuit.

The light emission time control circuit includes a first drive circuit, a coupling circuit, and a first voltage write circuit. The first voltage write circuit is configured to transmit a fixed voltage to a control terminal of the first drive circuit. The coupling circuit is configured to couple a first data voltage and a sweep signal to the control terminal of the first drive circuit. A first terminal of the first drive circuit outputs a control voltage to a control terminal of the current control circuit to control a voltage of the control terminal of the current control circuit according to the first data voltage and the sweep signal to control light emission time of the light emission circuit.

An output terminal of the current control circuit is connected to the light emission circuit. The current control circuit is configured to drive the light emission circuit to emit light at a light emission stage according to the voltage of the control terminal of the current control circuit and a voltage of an input terminal of the current control circuit.

According to another aspect of the present application, a driving method of a pixel circuit is provided. The pixel circuit includes a light emission time control circuit, a current control circuit, and a light emission circuit. The light emission time control circuit includes a first drive circuit, a coupling circuit, and a first voltage write circuit. The coupling circuit is connected to a control terminal of the first drive circuit. A control terminal of the current control circuit is connected to an output terminal of the light emission time control circuit. An output terminal of the current control circuit is connected to the light emission circuit.

The driving method of a pixel circuit includes the following.

At a voltage write stage, the first voltage write circuit is controlled to write a fixed voltage to the control terminal of the first drive circuit, and a first data voltage is controlled to be written to the coupling circuit.

At a voltage normalization stage, the coupling circuit is controlled to couple the first data voltage to the control terminal of the first drive circuit.

At a light emission stage, a voltage of the control terminal of the first drive circuit is controlled through a sweep signal and then a voltage of the control terminal of the current control circuit is controlled to control light emission time of the light emission circuit.

According to another aspect of the present application, a display device is provided. The display device includes the pixel circuit provided in any embodiment of the present application.

According to the technical solutions provided in embodiments of the present application, the current control circuit generates a driving current to drive the light emission circuit to emit light. The light emission time control circuit controls the voltage of the control terminal of the current control circuit to control the on time of the current control circuit, thereby controlling the light emission time of the light emission circuit. In the technical solutions in the related art, to guarantee that various transistors are turned on and off normally, various control signals need to be set according to corresponding data signals, and a data voltage needs to be greater than a power voltage. In comparison, in the technical solutions provided in embodiments of the present application, the first data voltage is written to the control terminal of the first drive circuit indirectly through the coupling circuit so that the on state of the first drive circuit does not need to be set according to the magnitude of the first data voltage. With no requirements on the magnitude of the voltage between the first data voltage and the power voltage (for example, the first power voltage) connected to a second terminal of the first drive circuit, the first power voltage VDD can be set flexibly, thus reducing the voltage span of the pixel voltage, thereby reducing a bias voltage applied to an element, and improving the reliability of the pixel circuit.

DETAILED DESCRIPTION

The technical solutions in the embodiments of the present application are described clearly and completely hereinafter in conjunction with the drawings in the embodiments of the present application.

It is to be noted that terms such as "first" and "second" in the description, claims and drawings of the present application are used to distinguish between similar objects and are not necessarily used to describe a particular order or sequence. It is to be understood that data used in this manner is interchangeable in appropriate cases so that the embodiments of the present application described herein can also be implemented in an order not illustrated or described herein. In addition, terms "comprising", "including", and any variation thereof are intended to encompass a non-exclusive inclusion. For example, a process, method, system, product, or device that includes a series of steps or units not only includes the expressly listed steps or units, but may also include other steps or units that are not expressly listed or are inherent to such a process, method, product, or device.

External power signals of a pixel circuit in the related art are complex, resulting in a large voltage span of the pixel voltage and reducing the reliability of the pixel circuit. The reason for the preceding problem lies in that regarding the manner of analog-digital hybrid driving in the related art, the pixel circuit usually includes a pulse width modulation (PWM) drive circuit and a pulse amplitude modulation (PAM) drive circuit. The PWM drive circuit is configured to convert an analog grayscale voltage through the PWM into the on-off time for controlling the PAM drive circuit to generate a driving current. A control relationship exists between the PWM drive circuit and the PAM drive circuit. That is, the PWM drive circuit needs to control the PAM drive circuit. To guarantee the normal operation of the two circuits, an operating voltage and driving signal of the PWM drive circuit and an operating voltage and driving signal of the PAM drive circuit need to be set separately. Moreover, a difference exists between a data voltage and a power voltage, leading to the complexity of external power signals and making the entire the voltage span of the pixel voltage relatively large.

Figure 1:
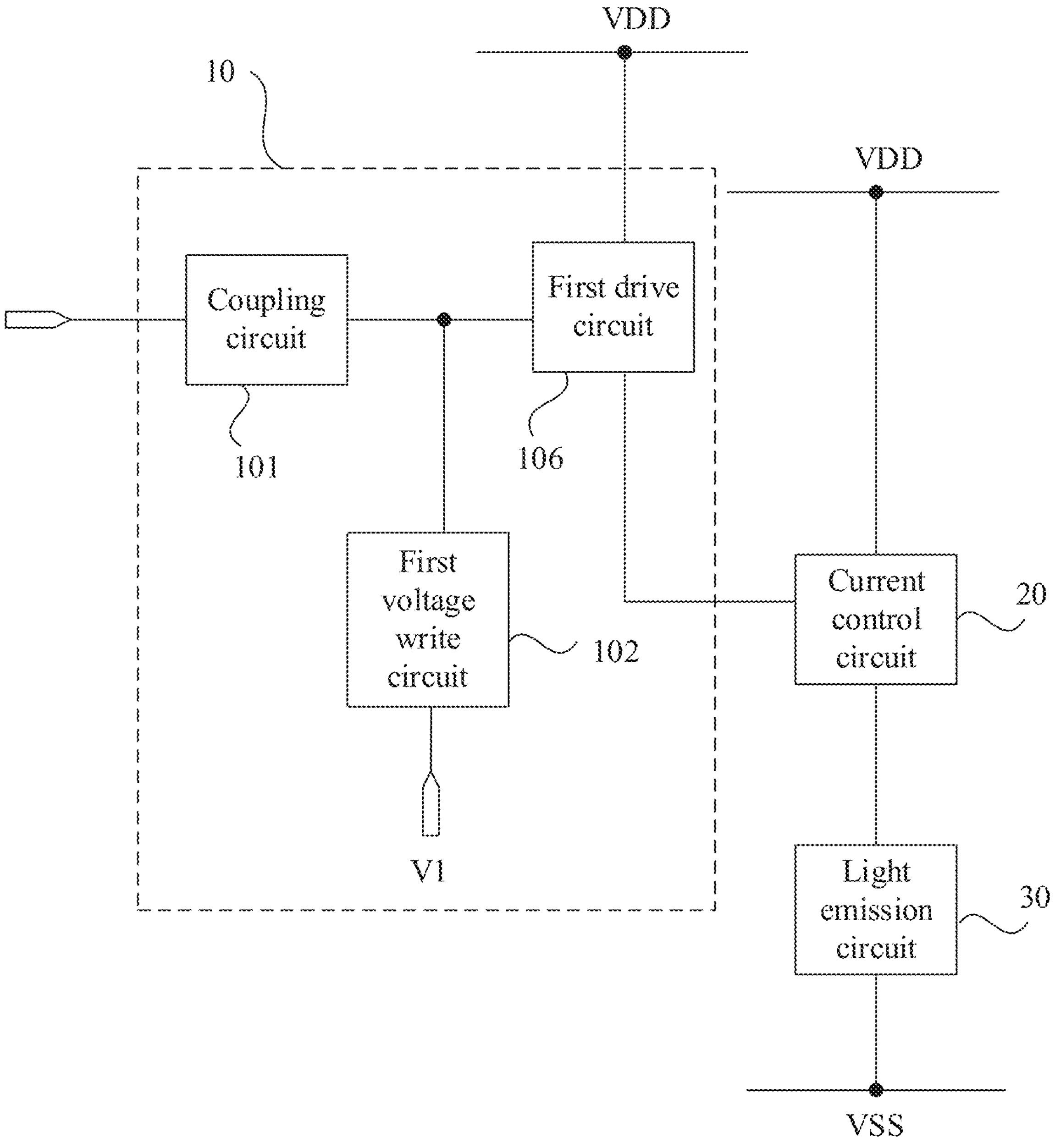
FIG. 1 is a structure diagram of a pixel circuit according to an embodiment of the present application.
Figure 2:
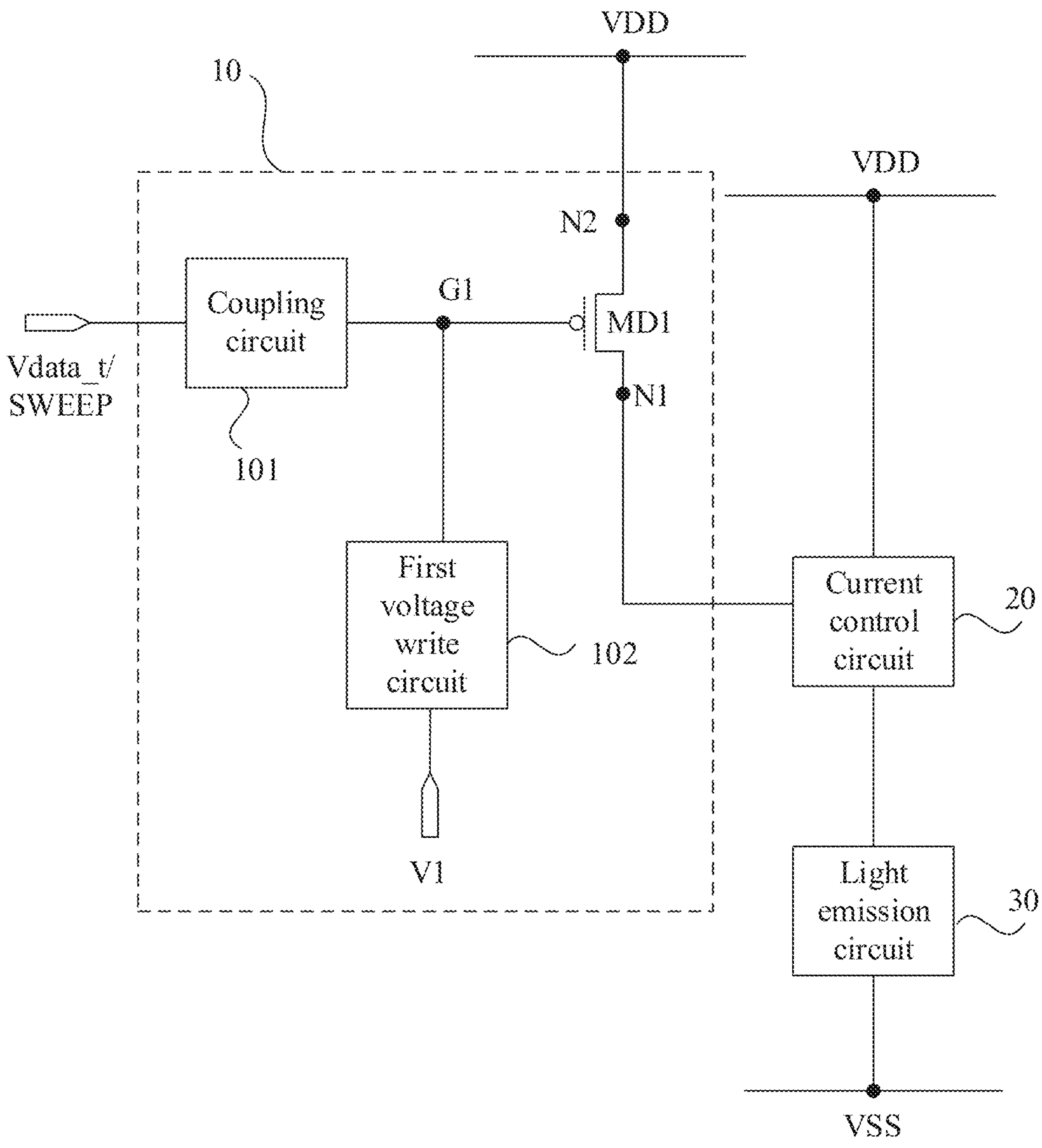
FIG. 2 is a structure diagram of another pixel circuit according to an embodiment of the present application.

An embodiment of the present application provides a pixel circuit to reduce the voltage span of the pixel voltage and improve the reliability of the pixel circuit. FIG. 1 is a structure diagram of a pixel circuit according to an embodiment of the present application. FIG. 2 is a structure diagram of another pixel circuit according to an embodiment of the present application. Referring to FIGS. 1 and 2, the pixel circuit provided in the embodiment of the present application includes a light emission time control circuit 10, a current control circuit 20, and a light emission circuit 30. The light emission time control circuit 10 includes a first drive circuit 106, a coupling circuit 101, and a first voltage write circuit 102. The first voltage write circuit 102 is configured to transmit a fixed voltage to a control terminal of the first drive circuit 106. The coupling circuit 101 is configured to couple a first data voltage Vdata_t and a sweep signal SWEEP to the control terminal of the first drive circuit 106. A first terminal of the first drive circuit 106 outputs a control voltage to a control terminal of the current control circuit 20 to control the voltage of the control terminal of the current control circuit 20 according to the first data voltage Vdata_t and the sweep signal SWEEP to control the light emission time of the light emission circuit 30. An output terminal of the current control circuit 20 is connected to the light emission circuit 30. The current control circuit 20 is configured to drive the light emission circuit 30 to emit light at a light emission stage according to the voltage of the control terminal of the current control circuit 20 and the voltage of an input terminal of the current control circuit 20.

Exemplarily, the current control circuit 20 and the light emission circuit 30 are connected between a first power line and a second power line. The first power line is configured to transmit a first power voltage VDD. The second power line is configured to transmit a second power voltage VSS. The current control circuit 20 can generate a driving current to drive the light emission circuit 30 to emit light when a discharge path between the first power line and the second power line is turned on. An output terminal of the light emission time control circuit 10 (that is, the first terminal of the first drive circuit 106) is connected to the control terminal of the current control circuit 20. The light emission time control circuit 10 controls the voltage of the output terminal of the light emission time control circuit 10 according to the first data voltage Vdata_t and the sweep signal SWEEP and thus controls the voltage of the control terminal of the current control circuit 20. The current control circuit 20 controls the on state of the discharge path between the first power line and the second power line according to the voltage of the control terminal of the current control circuit 20 and thus implements the object of controlling the light emission time of the light emission circuit 30.

The light emission time control circuit 10 includes the first drive circuit 106. The first drive circuit 106 may include a first drive transistor MD1. The first drive transistor MD1 includes a gate G1, a first electrode N1, and a second electrode N2. The second electrode N2 of the first drive transistor MD1 may be connected to the first power voltage VDD (in the embodiments hereinafter, by way of example, the first drive circuit 106 includes the first drive transistor MD1; the gate G1 of the first drive transistor MD1 serves as the control terminal of the first drive circuit 106; the first electrode N1 of the first drive transistor MD1 serves as the first terminal of the first drive circuit 106; and the second electrode N2 of the first drive transistor MD1 serves as a second terminal of the first drive circuit 106). The first voltage write circuit 102 is connected to the gate G1 of the first drive transistor MD1. The first voltage write circuit 102 is configured to transmit the fixed voltage V1 to the gate G1 of the first drive transistor MD1. The fixed voltage V1 may be a logic high-level voltage or a logic low-level voltage and may be set according to the circuit structure of the light emission time control circuit 10 and actual needs. Moreover, before the first data voltage Vdata_t, the first drive transistor MD1 is kept in the off state. The coupling circuit 101 is connected to the gate G1 of the first drive transistor MD1. The first voltage write circuit 102 transmits the fixed voltage V1 to the gate G1 of the first drive transistor MD1. The first data voltage Vdata_t is written to a first terminal of the coupling circuit 101. The two terminals of the coupling circuit 101 maintain a stable voltage difference. The first drive transistor MD1 is still in the off state. In this case, the current control circuit 20 may generate the driving current at the light emission stage according to the voltage state at the control terminal of the current control circuit 20 to drive the light emission circuit 30 to emit light.

The sweep signal SWEEP is used for performing signal scanning from a high level to a low level or from the low level to the high level at the light emission stage to control the voltage output from the output terminal of the light emission time control circuit 10, thus controlling the voltage state at the control terminal of the current control circuit 20, thereby controlling the operating state (on or off state) of the current control circuit 20, and controlling the light emission time of the light emission circuit 30.

In this embodiment, the first data voltage Vdata_t is written to the first terminal of the coupling circuit 101. An output terminal of the coupling circuit 101 has a constant voltage (which may be the preceding fixed voltage or another voltage enabling the first drive transistor MD1 to be turned off). Therefore, the two terminals of the coupling circuit 101 have a voltage difference. When the sweep signal SWEEP performs signal scanning, the level of the sweep signal SWEEP changes. Under the coupling of the coupling circuit 101, the voltage variation of the first terminal of the coupling circuit 101 is coupled to a second terminal of the coupling circuit 101 (the coupled voltage does not cause the first drive transistor MD1 to be turned on). Therefore, the voltage of the second terminal of the coupling circuit 101 is associated with the first data voltage Vdata_t. That is, the first data voltage Vdata_t is coupled to the gate G1 of the first drive transistor MD1. Here the first data voltage Vdata_t is written to the gate G1 of the first drive transistor MD1 through the coupling circuit 101, having no requirements on the magnitude of the first power voltage VDD transmitted on the first power line connected to the second electrode N2 of the first drive transistor MD1. After the first data voltage Vdata_t is written to the gate G1 of the first drive transistor MD1, the first drive transistor MD1 is still in the off state, not affecting the state of the output terminal of the light emission time control circuit 10. Therefore, the on state of the first drive transistor MD1 is controlled with no need for setting the magnitude of the first power voltage VDD according to the first data voltage Vdata_t. In other words, the first power voltage VDD does not need to be increased according to the increase of the first data voltage Vdata_t, facilitating the reduction of the voltage span of the pixel voltage (the voltage span here refers to the voltage difference between the maximum value and the minimum value of a voltage signal excluding a data voltage in the pixel circuit). Thus bias voltages applied to various elements are relatively small, improving the reliability of the pixel circuit.

According to the technical solutions provided in embodiments of the present application, the current control circuit generates the driving current to drive the light emission circuit to emit light. The light emission time control circuit controls the voltage of the control terminal of the current control circuit to control the turning-on time of the current control circuit, thereby controlling the light emission time of the light emission circuit. In the technical solutions in the related art, to guarantee that various transistors are turned on and off normally, various control signals need to be set according to corresponding data signals, and a data voltage needs to be greater than a power voltage. In comparison, in the technical solutions provided in embodiments of the present application, the first data voltage is written to the control terminal of the first drive circuit indirectly through the coupling circuit so that the on state of the first drive circuit does not need to be set according to the magnitude of the first data voltage. With no requirements on the magnitude of the voltage between the first data voltage and the power voltage (for example, the first power voltage) connected to the second terminal of the first drive circuit, the first power voltage VDD can be set flexibly, thus reducing the voltage span of the pixel voltage, thereby reducing a bias voltage applied to an element, and improving the reliability of the pixel circuit.

Figure 3:
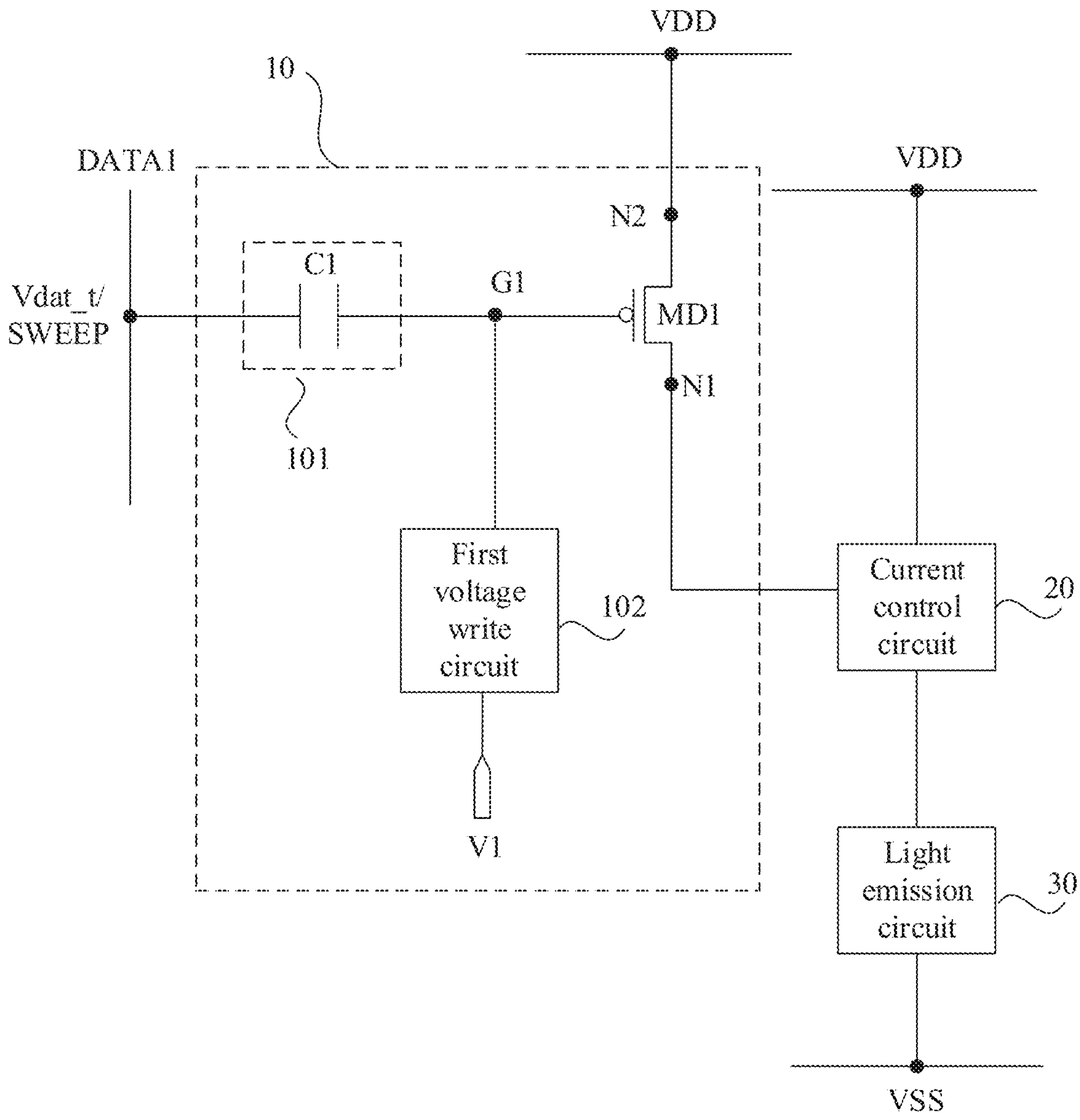
FIG. 3 is a structure diagram of another pixel circuit according to an embodiment of the present application.

FIG. 3 is a structure diagram of another pixel circuit according to an embodiment of the present application, on the basis of the preceding technical solutions, referring to FIG. 3, in this embodiment, the first terminal of the coupling circuit 101 is connected to a first data line DATA1. The output terminal of the coupling circuit 101 is connected to the gate G1 of the first drive transistor MD1. The first data voltage Vdata_t and the sweep signal SWEEP share the first data line DATA1.

In this embodiment, the first data line DATA1 is configured to write the first data voltage Vdata_t to the first terminal of the coupling circuit 101 at a voltage write stage. The coupling circuit 101 is configured to couple the first data voltage Vdata_t to the gate G1 of the first drive transistor MD1 at a voltage normalization stage. That is, at the voltage write stage, the first data voltage Vdata_t is merely written to the first terminal of the coupling circuit 101, and a fixed potential V1 is written to the output terminal of the coupling circuit 101. Therefore, the two terminals of the coupling circuit 101 have a potential difference. At the voltage normalization stage, the voltage on the first data line DATA1 hops to the sweep signal SWEEP. Due to the coupling, the coupling circuit 101 couples the voltage variation of the first terminal of the coupling circuit 101 to the second terminal of the coupling circuit 101. That is, the coupling circuit 101 couples a voltage including the first data voltage Vdata_t to the gate G1 of the first drive transistor MD1, thus coupling the first data voltage Vdata_t to the gate G1 of the first drive transistor MD1.

Exemplarily, as shown in FIG. 3, the coupling circuit 101 includes a first capacitor C1. A first terminal of the first capacitor C1 serves as the first terminal of the coupling circuit 101 to be connected to the first data line DARA1. A second terminal of the first capacitor C1 is connected to the gate of the first drive transistor MD1.

Exemplarily, in this embodiment, the operating process of the pixel circuits includes at least the voltage write stage, the voltage normalization stage, and the light emission stage. At the voltage write stage, the first voltage write circuit 102 is turned on first. The fixed voltage V1 is written to the gate G1 of the first drive transistor MD1. The first drive transistor MD1 is turned off. Moreover, the first data voltage Vdata_t transmitted on the first data line DATA1 is written to the first terminal of the first capacitor C1. In this case, the voltage difference between the two terminals of the first capacitor C1 is kept as the difference between the fixed voltage V1 and the first data voltage Vdata_t. Then the voltage normalization stage is entered. The voltage on the first data line DATA1 hops from the first data voltage Vdata_t to the sweep signal SWEEP, for example, to the high level of the sweep signal SWEEP. The level of the sweep signal SWEEP is greater than or equal to the maximum value of the first data voltage Vdata_t. The potential of the first terminal of the first capacitor C1 is heightened. Due to the coupling of the first capacitor C1, the potential change of the gate of the first drive transistor MD1 changes as a sum of the voltage variation of the fixed voltage V1 and the voltage variation of the voltage of the first terminal of the first capacitor C1. That is, the first data voltage Vdata_t is coupled to the gate G1 of the first drive transistor MD1. At the light emission state, the discharge path between the first power line, the current control circuit 20, the light emission circuit, and the second power line is turned on. The current control circuit 20 generates the driving current to drive the light emission circuit to emit light. Moreover, the sweep signal SWEEP changes gradually from the high level to the low level so that the potential of the first terminal of the first capacitor C1 is lowered. In this case, under the coupling of the first capacitor C1, the potential of the gate of the first drive transistor MID reduces accordingly. When the potential of the gate of reduces to enable the first drive transistor MD1 to be turned on, the first power voltage VDD is transmitted through the first drive transistor MID to the output terminal of the light emission time control circuit 10. In this case, the current control circuit 20 is turned off according to the voltage output from the output terminal of the light emission time control circuit 10 and does not output the driving current. The light emission circuit 30 is turned off. Therefore, the light emission time of the light emission circuit 30 is controlled.

In this embodiment, before the first data voltage Vdata_t is written to the gate G1 of the first drive transistor MD1, the first drive transistor MD1 is already turned off. Moreover, the first data voltage Vdata_t is written to the gate G1 of the first drive transistor MD1 through the first capacitor C1, thus having no requirements on the difference between the first data voltage Vdata_t and the first power voltage VDD. That is, the first power voltage VDD connected to the second electrode N2 of the first drive transistor MD1 does not need to vary with the first data voltage Vdata_t. In this case, the first power voltage VDD can be maintained at a low level, thus reducing the voltage difference in the pixel circuit, reducing bias voltages of various transistors or elements, and thereby reducing the possibility of element failure.

It needs to be noted that in the preceding embodiments, the first data voltage Vdata_t and the sweep signal SWEEP share the first data line DATA1. After the first data voltage Vdata_t is written to the coupling circuit 101, the voltage transmitted by the first data line DATA1 hops from the first data voltage Vdata_t to the sweep signal SWEEP, saving the number of signal lines and simplifying the circuit structure.

Figure 4:
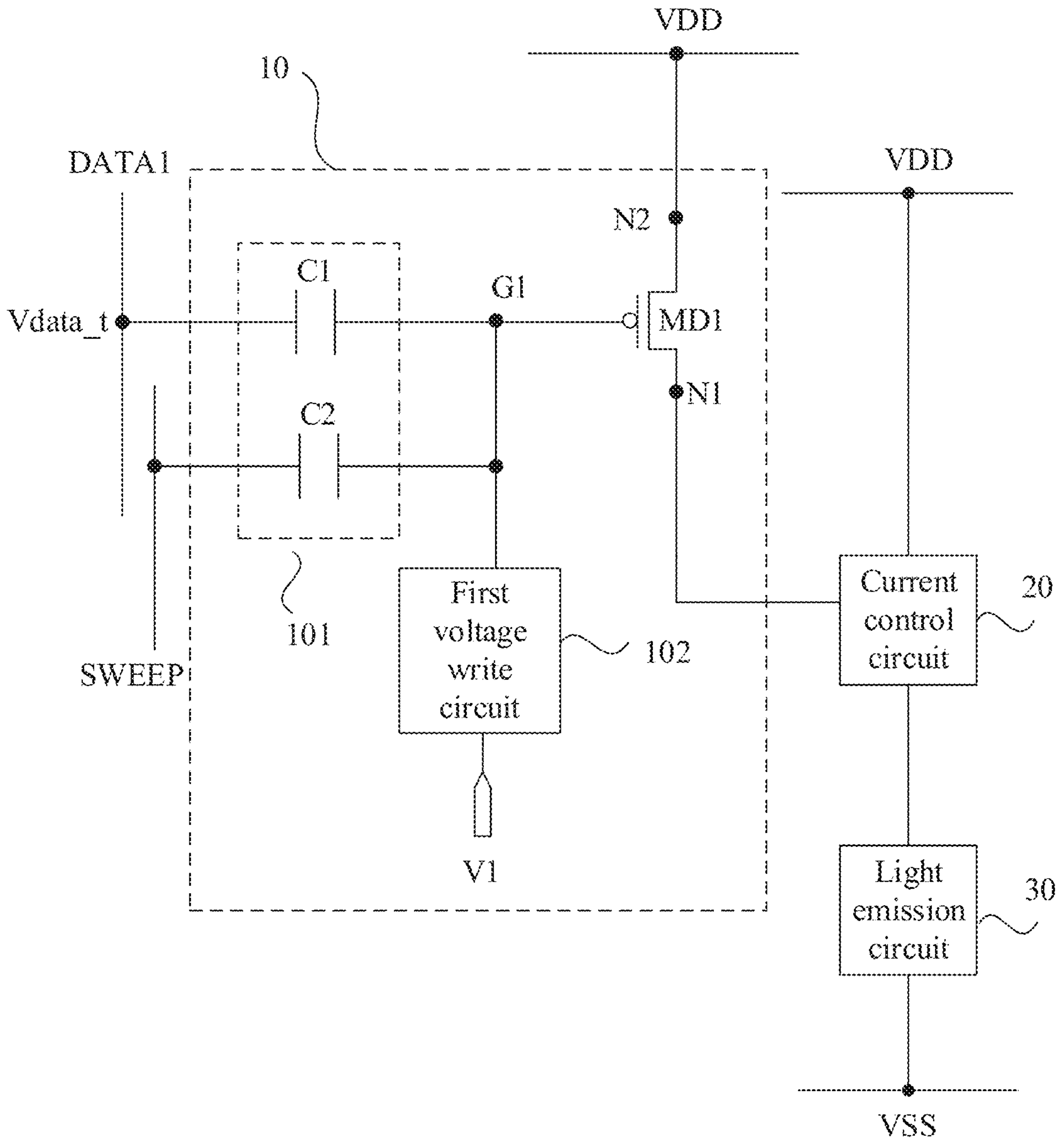
FIG. 4 is a structure diagram of another pixel circuit according to an embodiment of the present application.

Of course, in other embodiments, the first data voltage Vdata_t and the sweep signal SWEEP may also be set independently. FIG. 4 is a structure diagram of another pixel circuit according to an embodiment of the present application. Referring to FIG. 4, the first terminal of the coupling circuit 101 is connected to the first data line DATA1. The second terminal of the coupling circuit 101 is connected to a sweep signal line SWEEP (here for ease of description, a scanning signal line and a respective scanning signal output by the scanning signal line are denoted using the same reference). The output terminal of the coupling circuit 101 is connected to the gate G1 of the first drive transistor MD1. That is, at the voltage write state, the first data voltage Vdata_t is transmitted on the first data line DATA1 and written to the first terminal of the coupling circuit 101. The fixed potential V1 is written to the output terminal of the coupling circuit 101. At the voltage normalization stage, the voltage transmitted on the first data line DATA1 is heightened, for example, to the high level of the sweep signal SWEEP. Due to the coupling, the coupling circuit 101 couples the voltage variation of the first terminal of the coupling circuit 101 to the output terminal of the coupling circuit 101, thus coupling the first data voltage Vdata_t to the gate G1 of the first drive transistor MD1. At the light emission stage, the sweep signal SWEEP is transmitted on the sweep signal line and coupled and written to the second terminal of the coupling circuit 101. The light emission time control circuit 10 controls the voltage of the control terminal of the current control circuit 20 according to the sweep signal SWEEP to control the light emission time.

Exemplarily, as shown in FIG. 4, the coupling circuit 101 includes the first capacitor C1 and a second capacitor C2. The first terminal of the first capacitor C1 serves as the first terminal of the coupling circuit 101 to be connected to the first data line DATA1. The second terminal of the first capacitor C1 is connected to the gate G1 of the first drive transistor MD1. A first terminal of the second capacitor C2 serves as the second terminal of the coupling circuit 101 to be connected to the sweep signal line SWEEP. A second terminal of the second capacitor C2 is connected to the gate G1 of the first drive transistor MD1. Here for the operating process of the coupling 101, reference may be made to the related description in FIG. 3 and is not repeated.

In this embodiment, no switch element for switching between the first data voltage Vdata_t and the sweep signal SWEEP needs to be set whether the first data voltage Vdata_t and the sweep signal SWEEP share the same data line or are set independently, simplifying the circuit structure and reducing system costs It is to be understood that the preceding pixel circuit is not limited to a specific pixel circuit. Any pixel circuit controlled through the technical solutions provided in embodiments of the present application belongs to the scope of the present application. A specific pixel circuit structure is described hereinafter. However, the inventive concept of the present application is not limited to the specific pixel circuit structure below.

Figure 5:
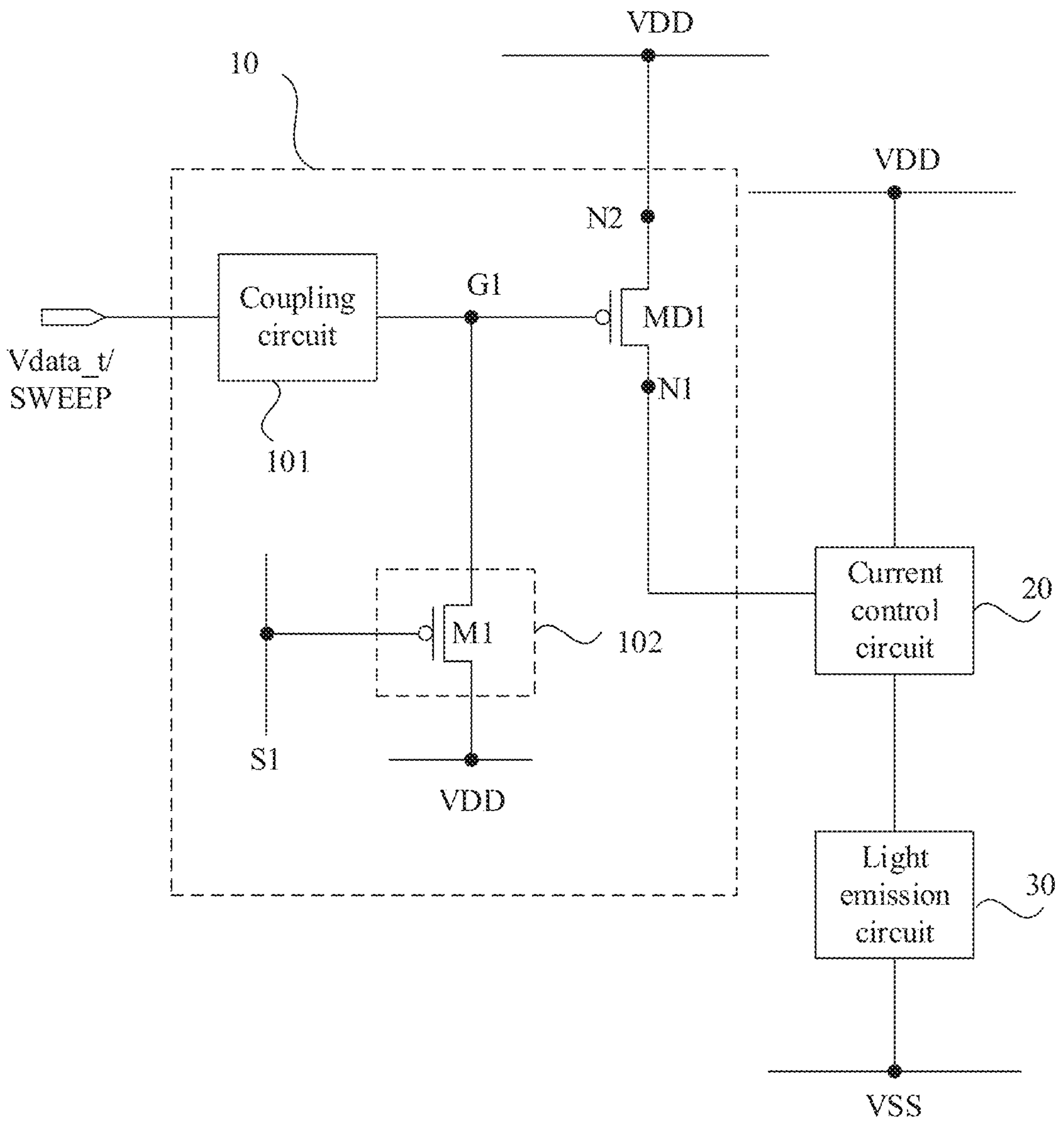
FIG. 5 is a structure diagram of another pixel circuit according to an embodiment of the present application.

FIG. 5 is a structure diagram of another pixel circuit according to an embodiment of the present application. Referring to FIG. 5, on the basis of the preceding technical solutions, optionally, the first voltage write circuit 102 includes a first switch transistor M1. A gate of the first switch transistor M1 is connected to a first scanning signal line S1. A first electrode of the first switch transistor M1 is connected to the first power line. A second electrode of the first switch transistor M1 is connected to the gate G1 of the first drive transistor MD1.

Exemplarily, the fixed voltage V1 transmitted by the first voltage write circuit 102 to the gate G1 of the first drive transistor MD1 may be the first power voltage VDD transmitted on the first power line. At the voltage write stage, in response to a first scanning signal output by the first scanning signal line S1, the first switch transistor M1 is turned on. The first power voltage VDD is written to the gate G1 of the first drive transistor MD1. Because the voltage connected to the second electrode N2 of the first drive transistor MD1 is the first power voltage VDD, the first drive transistor MD1 is turned off (here by way of example, the first drive transistor MD1 is a p-channel transistor; in other embodiments, the first drive transistor MD1 may also be an n-channel transistor). Moreover, the first data voltage Vdata_t is written to the first terminal of the coupling circuit 101. In this case, the voltage difference between the two terminals of the coupling circuit 101 is VDD−Vdata_t. Then the voltage normalization stage is entered. The first data voltage Vdata_t hops to the high level of the sweep signal SWEEP. The coupling circuit 101 couples the voltage variation of the first terminal of the coupling circuit 101 to the gate G1 of the first drive transistor MD1. At the light emission stage, the current control circuit 20 drives the light emission circuit 30 to emit light. Moreover, the sweep signal SWEEP changes from the high level to the low level gradually to perform signal scanning. Due to the coupling of the coupling circuit 101, the potential of the gate of the first drive transistor MD1 reduces gradually in the process of the reduction of the sweep signal SWEEP. When the voltage difference between the gate G1 of the first drive transistor MD1 and the second electrode N2 of the first drive transistor MD1 is less than the threshold voltage of the first drive transistor MD1, the first drive transistor MD1 is turned on. The first power voltage VDD is transmitted to the control terminal of the current control circuit 20. The current control circuit 20 is turned off. The light emission circuit 30 is turned off.

Figure 6:
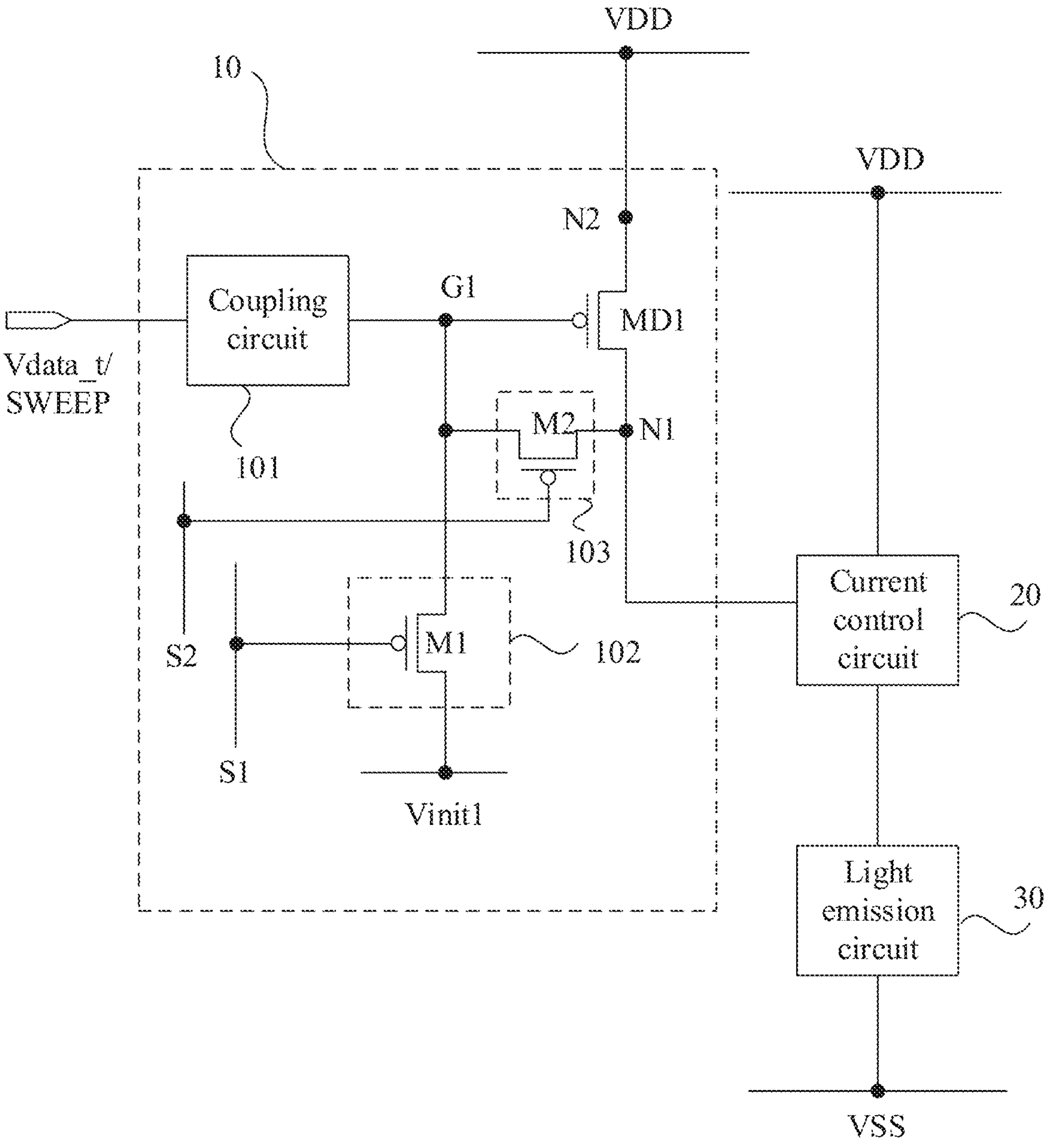
FIG. 6 is a structure diagram of another pixel circuit according to an embodiment of the present application.

FIG. 6 is a structure diagram of another pixel circuit according to an embodiment of the present application. Referring to FIG. 6, optionally, the light emission time control circuit 10 further includes a first compensation circuit 103. The first compensation circuit 103 is connected between the first electrode N1 of the first drive transistor MD1 and the gate G1 of the first drive transistor MD1. The first voltage write circuit 102 includes the first switch transistor M1. The first compensation circuit 103 includes a second switch transistor M2. The gate of the first switch transistor M1 is connected to the first scanning signal line S1. The first electrode of the first switch transistor M1 is connected to a first initialization signal line. The second electrode of the first switch transistor M1 is connected to the gate G1 of the first drive transistor MD1. A gate of the second switch transistor M2 is connected to a second scanning signal line S2. A first electrode of the second switch transistor M2 is connected to the first electrode N1 of the first drive transistor MD1. A second electrode of the second switch transistor M2 is connected to the gate G1 of the first drive transistor MD1. The second electrode N2 of the first drive transistor MD1 is connected to the first power line.

Exemplarily, compared with the pixel circuit shown in FIG. 5, the first compensation circuit 103 is added to the pixel circuit shown in FIG. 6. The first compensation circuit 103 is configured to perform threshold compensation for the first drive transistor MD1 to guarantee the accuracy of switching the first data voltage Vdata_t to a time control signal, improving the reliability of controlling the current control circuit 20. Here the first voltage write circuit 102 is configured to transmit a first initialization voltage Vinit1 on the first initialization signal line.

At the voltage write stage, in response to the first scanning signal S1, the first switch transistor M1 is turned on and transmits the first initialization voltage Vinit1 to the gate G1 of the first drive transistor MD1 to initialize the potential of the gate of the first drive transistor MD1, preventing the residual voltage of the previous frame from affecting the light emission of the current frame. In this case, the first drive transistor MD1 is in the on state. Then in response to a second scanning signal S2, the second switch transistor M2 is turned on. The first power voltage VDD is written through the first drive transistor MD1 and the second switch transistor M2 to the gate of the first drive transistor MD1. When the potential of the gate of the first drive transistor MD1 is VDD+Vth1, the first drive transistor MD1 is turned off. In this case, Vth1 denotes the threshold voltage of the first drive transistor MD1. After the compensation ends, the gate G1 of the first drive transistor MD1 forms a stable potential (that is, VDD+Vth1). Moreover, the first data voltage Vdata_t is written to the first terminal of the coupling circuit 101. The voltage difference between the two terminals of the coupling circuit 101 is VDD+Vth1−Vdata_t.

After the writing of the first data voltage Vdata_t is completed, the voltage normalization stage is entered. The first data voltage Vdata_t hops to the sweep signal SWEEP and is kept at the high level of the sweep signal SWEEP. The level of the sweep signal SWEEP is greater than or equal to the maximum value of the first data voltage Vdata_t. In this case, the voltage of the gate G1 of the first drive transistor MD1 is Vdata'+VDD+Vth1−Vdata_t. Vdata' denotes the high level of the sweep signal SWEEP.

In this embodiment, in the normal operating process of the pixel circuit, the low first data voltage Vdata_t corresponds to a high grayscale. The smaller the first data voltage Vdata_t, the higher the potential of the gate of the first drive transistor MD1. In the case of the scan frequency of the sweep signal SWEEP is constant, the longer the light emission time of the light emission circuit 30, the higher the display grayscale. Therefore, the first data voltage Vdata_t is written to the gate G1 of the first drive transistor MD1 through a coupling manner. Moreover, the first data voltage Vdata_t is heightened at the voltage normalization stage. Because a low level of the first data voltage Vdata_t corresponds to a high grayscale, the first data voltage Vdata_t has a large usable voltage range and a large number of color scales, facilitating the expansion of grayscales.

At the light emission stage, the current control circuit 20 drives the light emission circuit 30 to emit light. The sweep signal SWEEP changes from the high level to the low level gradually. Due to the coupling of the coupling circuit 101, the potential of the gate of the first drive transistor MD1 reduces gradually in the process of the reduction of the sweep signal SWEEP. When the voltage difference between the gate G1 of the first drive transistor MD1 and the second electrode N2 of the first drive transistor MD1 is less than the threshold voltage of the first drive transistor MD1, the first drive transistor MD1 is turned on. The first power voltage VDD is transmitted to the control terminal of the current control circuit 20. The current control circuit 20 is turned off. The light emission circuit 30 is turned off.

Figure 7:
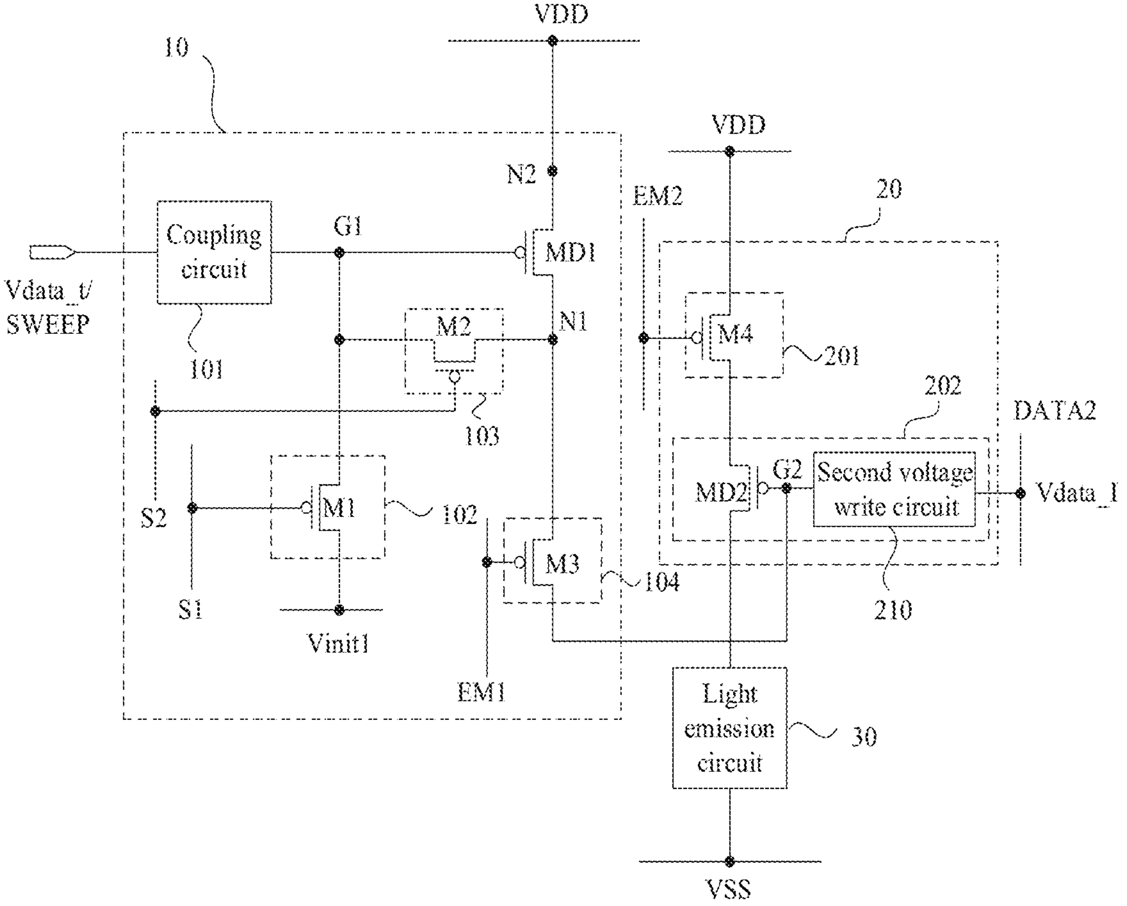
FIG. 7 is a structure diagram of another pixel circuit according to an embodiment of the present application.

Exemplarily, the current control circuit 20 may be a PAM circuit configured to generate the driving current according to the corresponding data voltage. The voltage output from the output terminal of the light emission time control circuit 10 may control the PAM circuit directly, thus controlling the operating state of the PAM circuit. FIG. 7 is a structure diagram of another pixel circuit according to an embodiment of the present application. Referring to FIG. 7, on the basis of the preceding embodiments, the light emission time control circuit 10 further includes a first light emission control circuit 104. The current control circuit 20 includes a second light emission control circuit 201 and a second drive circuit 202. A second terminal of the first light emission control circuit 104 serves as the control terminal of the light emission time control circuit 10. A control terminal of the second drive circuit 202 serves as the control terminal of the current control circuit 20. The second terminal of the first light emission control circuit 104 is connected to the control terminal of the second drive circuit 202. A first terminal of the first light emission control circuit 104 is connected to the first terminal of the first drive circuit. A control terminal of the first light emission control circuit 104 is connected to a first light emission control signal line EM1.

Exemplarily, the first light emission control circuit 104 includes a third switch transistor M3. The second light emission control circuit 201 includes a fourth switch transistor M4. The second drive circuit 202 includes a second drive transistor MD2 and a second voltage write circuit 210. A gate G2 of the second drive transistor MD2 serves as the control terminal of the second drive circuit 202. The first drive transistor MD1 is electrically connected to the second drive transistor MD2. A gate of the third switch transistor M3 is connected to the first light emission control signal line EM1. A first electrode of the third switch transistor M3 is connected to the first electrode N1 of the first drive transistor MD1. A second electrode of the third switch transistor M3 is connected to the gate G2 of the second drive transistor MD2. The second drive transistor MD2 is connected between a second electrode of the fourth switch transistor M4 and the light emission circuit 30. A first electrode of the fourth switch transistor M4 is connected to the first power line. A gate of the fourth switch transistor M4 is connected to a second light emission control signal line EM2. The second voltage write circuit 210 is configured to transmit a second data voltage Vdata_I to the gate G2 of the second drive transistor MD2 at the voltage write stage. At the light emission stage, in response to a second light emission control signal EM2, the fourth switch transistor M4 is turned on. The second drive transistor MD2 generates the driving current under the action of the second data voltage Vdata_I and the first power voltage VDD to drive the light emission circuit 30 to emit light. Moreover, in response to a first light emission control signal EM1, the third switch transistor M3 is turned on. In the scanning process of the sweep signal SWEEP, when the voltage of the gate of the first drive transistor MD1 reduces to turn on the first drive transistor MD1, the first power voltage VDD is transmitted to the gate G2 of the second drive transistor MD2. The potential of the gate of the second drive transistor MD2 is heightened. The second drive transistor MD2 is turned off, thus unable to output the driving current. Then, the light emission circuit 30 is turned off.

Figure 8:
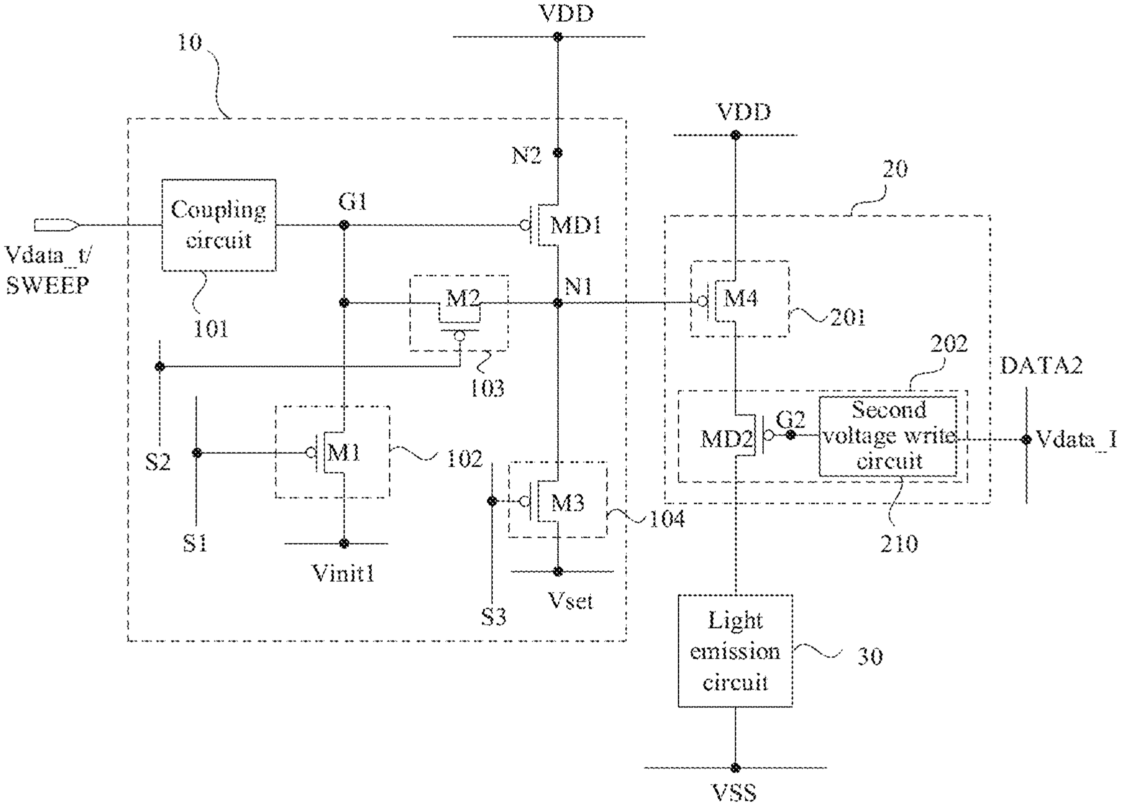
FIG. 8 is a structure diagram of another pixel circuit according to an embodiment of the present application.

In an optional implementation provided in this embodiment, the first electrode N1 of the first drive transistor MD1 may serve as the output terminal of the light emission time control circuit 10. FIG. 8 is a structure diagram of another pixel circuit according to an embodiment of the present application. Referring to FIG. 8, the light emission time control circuit 10 further includes the first light emission control circuit 104. The current control circuit 20 includes the second light emission control circuit 201 and the second drive circuit 202. A control terminal of the second light emission control circuit 201 serves as the control terminal of the current control circuit 20 to be connected to the first electrode N1 of the first drive transistor MD1. The first light emission control circuit 104 is configured to control the second light emission control circuit 201 to be turned on at a reset stage. The second drive circuit 202 includes the second drive transistor MD2 and the second voltage write circuit 210. A first electrode of the second drive transistor MD2 is connected to an output terminal of the second light emission control circuit 201. An input terminal of the second light emission control circuit 201 is connected to the first power line. The second voltage write circuit 210 is configured to transmit the second data voltage Vdata_I to the gate G2 of the second drive transistor MD2. The second drive transistor MD2 is configured to drive, according to the voltage of the gate G2 of the second drive transistor MD2 and the voltage of the first electrode of the second drive transistor MD2, the light emission circuit 30 to emit light.

For the working principle of the second drive circuit 202, reference may be made to the preceding description and is not repeated here. The first electrode N1 of the first drive transistor MD1 serves as the output terminal of the light emission time control circuit 10 and outputs a control voltage to the control terminal of the second light emission control circuit 201 to control the on state of the second light emission control circuit 201, thus controlling a discharge path of the second drive circuit 202 and thereby controlling the light emission time of the light emission circuit 30.

Optionally, the first light emission control circuit 104 includes the third switch transistor M3. The second light emission control circuit 201 includes the fourth switch transistor M4. The gate of the third switch transistor M3 is connected to a third scanning signal line S3. The first electrode of the third switch transistor M3 is connected to a reset signal line. The second electrode of the third switch transistor M3 is connected to the first electrode N1 of the first drive transistor MD1. The gate of the fourth switch transistor M4 is connected to the first electrode N1 of the first drive transistor MD1. The first electrode of the fourth switch transistor M4 is connected to the first power line. The second electrode of the fourth switch transistor M4 is connected to the first electrode of the second drive transistor MD2. A second electrode of the second drive transistor MD2 is connected to the light emission circuit 30. After the first data voltage Vdata_t is coupled and written to the gate G1 of the first drive transistor MD1, at the reset stage, the third switch transistor M3 is turned on in response to a third scanning signal S3 transmitted on the third scanning signal line and transmits a reset voltage Vset to the first electrode N1 of the first drive transistor MD1 (in this case, the first drive transistor MD1 is in the off state). That is, the voltage of the gate of the fourth switch transistor M4 is the reset voltage Vset. The fourth switch transistor M4 is turned on. The second drive transistor MD2 drives the light emission circuit 30 to emit light. Here the reset voltage Vset may be equal to the first initialization voltage Vinit1 or unequal to the first initialization voltage Vinit1, which may be set according to an actual situation.

At the light emission stage, the sweep signal SWEEP changes from the high level to the low level gradually. Due to the coupling of the coupling circuit 101, the potential of the gate of the first drive transistor MD1 is lowered until the first drive transistor MD1 is turned on. In this case, the first power voltage VDD is transmitted to the gate of the fourth switch transistor M4 to turn off the fourth switch transistor M4. The discharge path of the second drive transistor MD2 is turned off. The light emission circuit 30 is turned off.

In this embodiment, the light emission time control circuit 10 controls the light emission time of the light emission circuit 30 directly. The second drive circuit 202 controls merely the magnitude of the driving current. No direct signal control relationship exists between the light emission time control circuit 10 and the second drive circuit 202 so that the light emission time control circuit 10 and the second drive circuit 202 may share an operating voltage, thus simplifying the complexity of an external drive control signal and a voltage signal. Additionally, no direct electrical connection exists between the gate G1 of the first drive transistor MD1 and the gate G2 of the second drive transistor MD2. A leakage current of the first drive transistor MD1 affects merely the light emission time but not the driving current, thus reducing the sensitivity of the pixel circuit to the leakage current.

Figure 9:
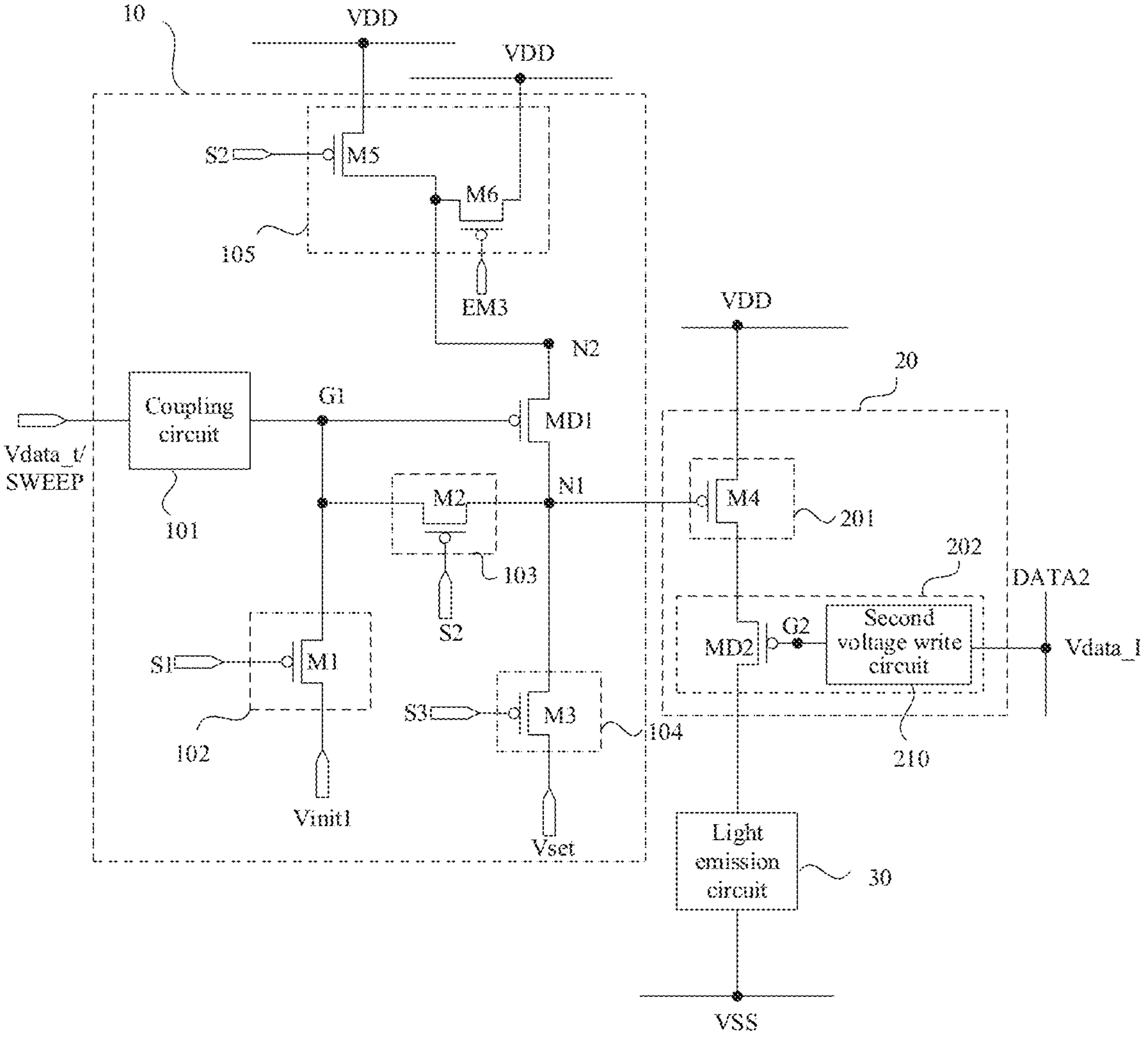
FIG. 9 is a structure diagram of another pixel circuit according to an embodiment of the present application.

FIG. 9 is a structure diagram of another pixel circuit according to an embodiment of the present application. Referring to FIG. 9, on the basis of the preceding technical solutions, optionally, the light emission time control circuit 10 further includes a third voltage write circuit 105. The third voltage write circuit 105 is connected between the second electrode N2 of the first drive transistor MD1 and the first power line to transmit the first power voltage VDD on the first power line to the second electrode N2 of the first drive transistor MD1.

An on-state capacitor exists between the gate G1 of the first drive transistor MD1 and the second electrode N2 of the first drive transistor MD1. When the second electrode N2 of the first drive transistor MD1 is connected to the first power line directly, the on-state capacitor is also connected to the first power line directly. After data writing is completed, charge flows through the on-state capacitor, thus affecting the charging and discharging rate of the gate G1 of the first drive transistor MD1, resulting in a decrease in the accuracy of controlling the light emission time, and not facilitating the expansion of grayscales. The arrangement of the third voltage write circuit 105 enables the on-state capacitor to be in a floating state after data writing, being equivalent to no capacitor at the gate G1 of the first drive transistor MD1, not affecting the charging and discharging rate of the first drive transistor MD1, and better controlling the light emission time of the light emission circuit 30.

Exemplarily, as shown in FIG. 9, the third voltage write circuit 105 includes a fifth switch transistor M5 and a sixth switch transistor M6. A gate of the fifth switch transistor M5 is connected to the second scanning signal line S2. A first electrode of the fifth switch transistor M5 is connected to the first power line. A second electrode of the fifth switch transistor M5 is connected to the second electrode N2 of the first drive transistor MD1. A gate of the sixth switch transistor M6 is connected to a third light emission control signal line EM3. A first electrode of the sixth switch transistor M6 is connected to the first power line. A second electrode of the sixth switch transistor M6 is connected to the second electrode N2 of the first drive transistor MD1.

In this embodiment, the fifth switch transistor M5 and the second switch transistor M2 are connected to the same scanning signal line. At the voltage write stage, the fifth switch transistor M5 and the second switch transistor M2 are turned on, compensating for the threshold voltage of the first drive transistor MD1. Then the fifth switch transistor M5 and the second switch transistor M2 are turned off. The second electrode N2 of the first drive transistor MD1 is disconnected from the first power voltage VDD. Regarding the coupling circuit 101, no on-state capacitor exists at the gate G1 of the first drive transistor MD1, not affecting the charging and discharging rate of the first drive transistor MD1. At the light emission stage, in response to the third light emission control signal line EM3, the sixth switch transistor M6 is turned on and transmits the first power voltage VDD to the second electrode N2 of the first drive transistor MD1 so that when the first drive transistor MD1 is turned on, the first power voltage VDD is transmitted to the gate of the fourth switch transistor M4 to control the fourth switch transistor M4 to be turned off, thereby controlling the light emission circuit 30 to be turned off.

Figure 10:
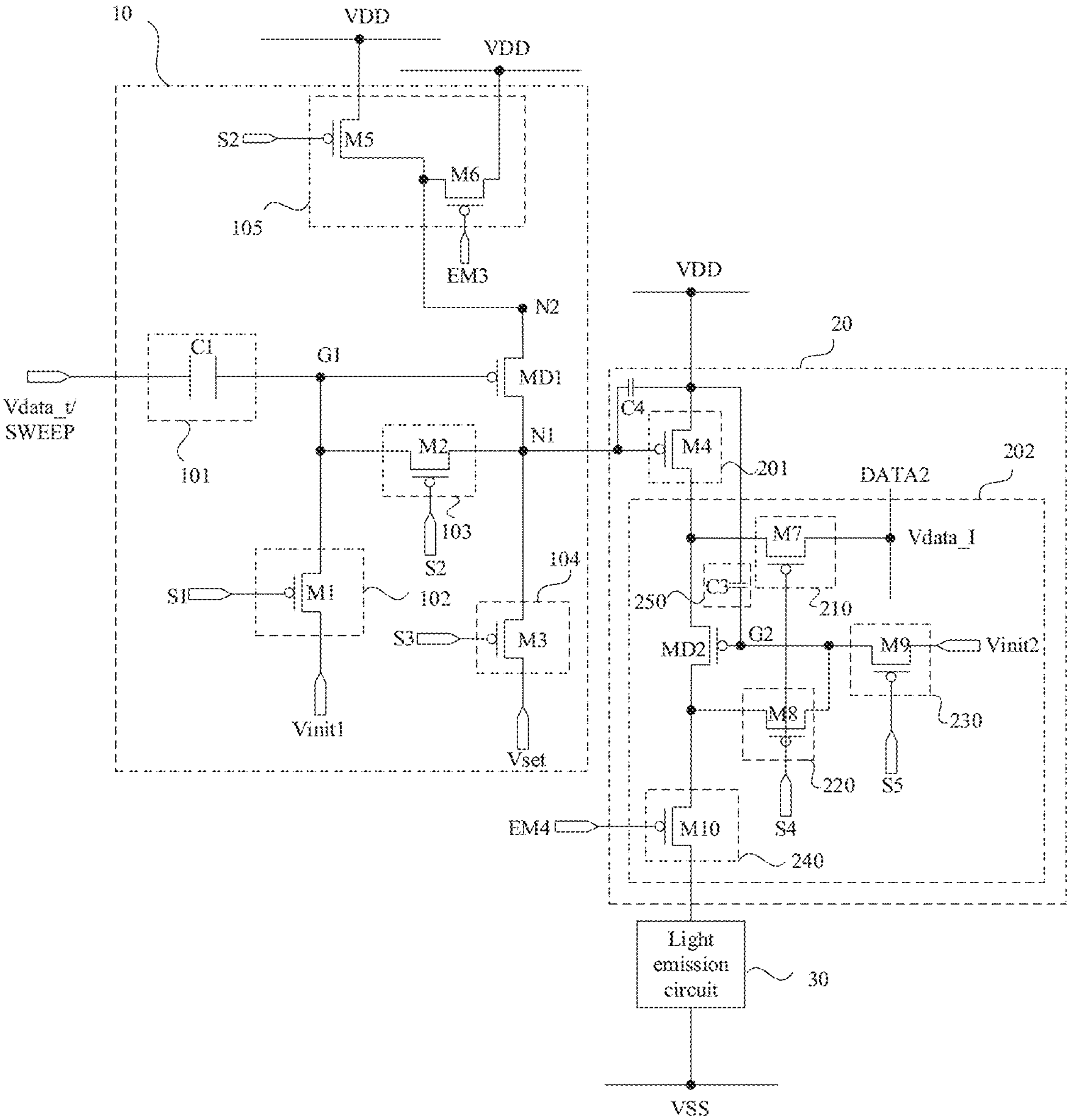
FIG. 10 is a structure diagram of another pixel circuit according to an embodiment of the present application.

FIG. 10 is a structure diagram of another pixel circuit according to an embodiment of the present application. Referring to FIG. 10, on the basis of the preceding technical solutions, optionally, the second drive circuit 202 further includes a storage circuit 250, a second compensation circuit 220, an initialization circuit 230, and a third light emission control circuit 240. The storage circuit 250 includes a third capacitor C3. The second voltage write circuit 210 includes a seventh switch transistor M7. The second compensation circuit 220 includes an eighth switch transistor M8. The initialization circuit 230 includes a ninth switch transistor M9. The third light emission control circuit 240 includes a tenth switch transistor M10. The third capacitor C3 is connected between the gate G2 of the second drive transistor MD2 and the first power line. Each of a gate of the seventh switch transistor M7 and a gate of the eighth switch transistor M8 are connected to a fourth scanning signal line S4. A first electrode of the seventh switch transistor M7 is connected to a second data line DATA2. A second electrode of the seventh switch transistor M7 is connected to the first electrode of the second drive transistor MD2. A first electrode of the eighth switch transistor M8 is connected to the gate G2 of the second drive transistor MD2. A second electrode of the eighth switch transistor M8 is connected to the second electrode of the second drive transistor MD2. A gate of the ninth switch transistor M9 is connected to a fifth scanning signal line S5. A first electrode of the ninth switch transistor M9 is connected to a second initialization signal line. A second electrode of the ninth switch transistor M9 is connected to the gate G2 of the second drive transistor MD2. A gate of the tenth switch transistor M10 is connected to a fourth light emission control signal line EM4. A first electrode of the tenth switch transistor M10 is connected to the second electrode of the second drive transistor MD2. A second electrode of the tenth switch transistor M10 is connected to a first terminal of the light emission circuit 30. A second terminal of the light emission circuit 30 is connected to the second power line.

The second compensation circuit 220 can compensate for the threshold voltage of the second drive transistor MD2 to improve the uniformity of the second drive transistor MD2 generating the driving current. The initialization circuit 230 is configured to initialize the voltage of the gate of the second drive transistor MD2 at the initialization stage to reduce the effect of the residual voltage of the previous frame on the display of the current frame.

Figure 11:
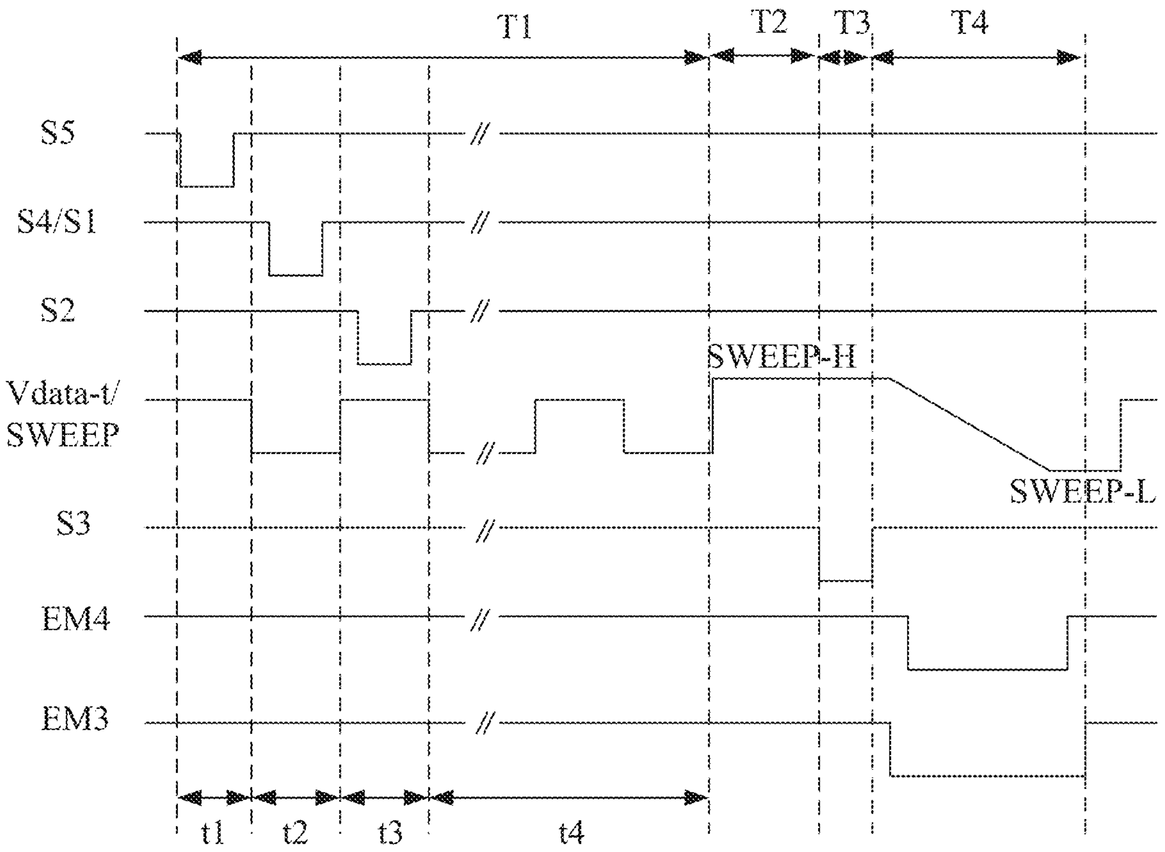
FIG. 11 is a timing graph of the pixel circuit according to an embodiment of the present application.

FIG. 11 is a timing graph of the pixel circuit according to an embodiment of the present application and may be applied to the pixel circuit shown in FIG. 10. Referring to FIGS. 10 and 11, by way of example, all the transistors are p-type transistors. The operating process of the pixel circuit provided in the embodiment of the present application includes at least the voltage write stage T1, the voltage normalization stage T2, the reset stage T3, and the light emission stage T4. The voltage write stage T1 includes a plurality of sub-stages.

At a first sub-stage t1 (corresponding to the initialization stage), the fifth scanning signal line is configured to transmit a fifth scanning signal S5 at logic low-level. The first scanning signal line is configured to transmit a first scanning signal S1 at logic high-level. The fourth scanning signal line is configured to transmit a fourth scanning signal S4 at logic high-level. The second scanning signal line is configured to transmit a second scanning signal S2 at logic high-level. The third scanning signal line is configured to transmit a third scanning signal S3 at logic high-level. The third light emission control signal line is configured to transmit a third light emission control signal EM3 at logic high-level. The fourth light emission control signal line is configured to transmit a fourth light emission control signal EM4 at logic high-level. In this case, the ninth switch transistor M9 is turned on, and other switch transistors are turned off. A second initialization voltage Vinit2 transmitted on the second initialization signal line is written to the gate G2 of the second drive transistor MD2, initializing the potential of the gate of the second drive transistor MD2.

At a second sub-stage t2 (corresponding to the second voltage write stage), the fifth scanning signal line is configured to transmit the fifth scanning signal S5 at logic high-level. The first scanning signal line is configured to transmit the first scanning signal S1 at logic low-level. The fourth scanning signal line is configured to transmit the fourth scanning signal S4 at logic low-level. The second scanning signal line is configured to transmit the second scanning signal S2 at logic high-level. The third scanning signal line is configured to transmit the third scanning signal S3 at logic high-level. The third light emission control signal line is configured to transmit the third light emission control signal EM3 at logic high-level. The fourth light emission control signal line is configured to transmit the fourth light emission control signal EM4 at logic high-level. In this case, the first switch transistor M1, the seventh switch transistor M7, and the eighth switch transistor M8 are turned on; and other switch transistors are turned off. The second data voltage Vdata_I is written to the gate G2 of the second drive transistor MD2 through the seventh switch transistor M7, the second drive transistor MD2, and the eighth switch transistor M8. The potential of the gate G2 of the second drive transistor MD2 is Vdata_I+Vth2 and is stored on the third capacitor C3. Vth2 denotes the threshold voltage of the second drive transistor MD2, implementing the threshold compensation for the second drive transistor MD2. Moreover, the first initialization voltage Vinit1 transmitted on the first initialization signal line is written to the gate G1 of the first drive transistor MD1 through the first switch transistor M1, initializing the potential of the gate of the first drive transistor MD1.

At a third sub-stage t3 (corresponding to the first voltage write stage), the fifth scanning signal line is configured to transmit the fifth scanning signal S5 at logic high-level. The first scanning signal line is configured to transmit the first scanning signal S1 at logic high-level. The fourth scanning signal line is configured to transmit the fourth scanning signal S4 at logic high-level. The second scanning signal line is configured to transmit the low-level second scanning signal S2. The third scanning signal line is configured to transmit the third scanning signal S3 at logic high-level. The third light emission control signal line is configured to transmit the third light emission control signal EM3 at logic high-level. The fourth light emission control signal line is configured to transmit the fourth light emission control signal EM4 at logic high-level. In this case, the second switch transistor M2 and the fifth switch transistor M5 are turned on. The first power voltage VDD charges the gate G1 of the first drive transistor MD1 until the voltage of the gate of the first drive transistor MD1 is VDD+Vth1. The first drive transistor MD1 is turned off. The potential of the gate of the first drive transistor MD1 is stabilized at VDD+Vth1, implementing the threshold compensation for the first drive transistor MD1. Moreover, the first data voltage Vdata_t transmitted on the first data line is written to the first terminal of the first capacitor C1 (by way of example, the coupling circuit 101 includes merely the first capacitor C1). In this case, the voltage difference between the two terminals of the first capacitor C1 is VDD+Vth1−Vdata_t.

At a fourth sub-stage t4, other rows of sub-pixels enter the first sub-stage t1, the second sub-stage t2, and the third sub-stage t3 gradually, completing the data writing of all pixel rows.

At the voltage normalization stage T2, the first data voltage Vdata_t transmitted on the first data line hops to the high level SWEEP-H of the sweep signal SWEEP. In this embodiment, the high level SWEEP-H of the sweep signal SWEEP is greater than or equal to the maximum value of the first data voltage Vdata_t. For example, SWEEP-H=Vdata'. The voltage of the first terminal of the first capacitor C1 is heightened from Vdata_t to Vdata'. In this case, the voltage of the second terminal of the first capacitor C1 is Vdata'+VDD+Vth1−Vdata_t. The first data voltage Vdata_t is written to the gate G1 of the first drive transistor MD1. Here the fifth switch transistor M5 and the sixth switch transistor M6 are turned off. In this case, no on-state capacitor exists between the gate G1 of the first drive transistor MD1 and the second electrode N2 of the first drive transistor MD1, not affecting the charging and discharging rate of the first drive transistor MD1 and able to guarantee the accuracy of the voltage of the gate of the first drive transistor MD1.

At the reset stage T3, the fifth scanning signal line is configured to transmit the fifth scanning signal S5 at logic high-level. The first scanning signal line is configured to transmit the first scanning signal S1 at logic high-level. The fourth scanning signal line is configured to transmit the fourth scanning signal S4 at logic high-level. The second scanning signal line is configured to transmit the second scanning signal S2 at logic high-level. The third scanning signal line is configured to transmit the low-level third scanning signal S3. The third light emission control signal line is configured to transmit the third light emission control signal EM3 at logic high-level. The fourth light emission control signal line is configured to transmit the fourth light emission control signal EM4 at logic high-level. In this case, the third switch transistor M3 is turned on, and other switch transistors are turned off. The reset voltage Vset is written to the gate of the fourth switch transistor M4 and a fourth capacitor C4. The fourth switch transistor M4 is turned on. The first power voltage VDD is transmitted to the first electrode of the second drive transistor MD2.

At the light emission stage T4, the fifth scanning signal line is configured to transmit the fifth scanning signal S5 at logic high-level. The first scanning signal line is configured to transmit the first scanning signal S1 at logic high-level. The fourth scanning signal line is configured to transmit the fourth scanning signal S4 at logic high-level. The second scanning signal line is configured to transmit the second scanning signal S2 at logic high-level. The third scanning signal line is configured to transmit the third scanning signal S3 at logic high-level. The third light emission control signal line is configured to transmit the third light emission control signal EM3 at logic low-level. The fourth light emission control signal line is configured to transmit the fourth light emission control signal EM4 at logic low-level. The sixth switch transistor M6 and the tenth switch transistor M10 are turned on. The second drive transistor MD2 generates the driving current according to the first power voltage VDD and the second data voltage Vdata_I (stored on the third capacitor C3) to drive the light emission circuit 30 to emit light. The driving current may be expressed by the formulas below.

$$Id=\frac{1}{2}\mu C_{ox}\frac{W}{L}(V_{GS}-Vth2)^2=$$

$$\frac{1}{2}\mu C_{ox}\frac{W}{L}\left(Vdata\text{-}I+Vth2-VDD-Vth2\right)^2=\frac{1}{2}\mu C_{ox}\frac{W}{L}\left(Vdata\text{-}I-VDD\right)^2$$

μ denotes the electron mobility of the second drive transistor MD2. $C_{ox}$ denotes the channel capacitance per unit area of the second drive transistor MD2. W/L denotes the width-to-length ratio of the second drive transistor MD2. Vth2 denotes the threshold voltage of the second drive transistor MD2. In this embodiment, the light emission circuit 30 may include at least one of an OLED, a micro-LED, or a mini-LED.

Moreover, the sweep signal SWEEP changes from the high level SWEEP-H to the low level SWEEP-L gradually. Due to the coupling of the first capacitor C1, the potential of the gate of the first drive transistor MID changes synchronously. When the sweep signal reduces to enable the potential VG1 of the gate of the first drive transistor MD1 to satisfy that VG1−VDD=Vth1, the first drive transistor MD1 is turned on. The first power voltage VDD is transmitted to the gate of the fourth switch transistor M4 through the sixth switch transistor M6 and the first drive transistor MD1, controlling the fourth switch transistor M4 to be turned off. The fourth capacitor C4 is configured to maintain the potential of the gate of the fourth switch transistor M4. Therefore, the first electrode of the second drive transistor MD2 is disconnected from the first power line. The driving current is zero. The light emission circuit 30 is turned off, implementing the control of the light emission time.

It is to be noted that in this embodiment, the first scanning signal S1 and the fourth scanning signal S4 may share the same scanning signal line to save the number of signal lines.

Figure 12:
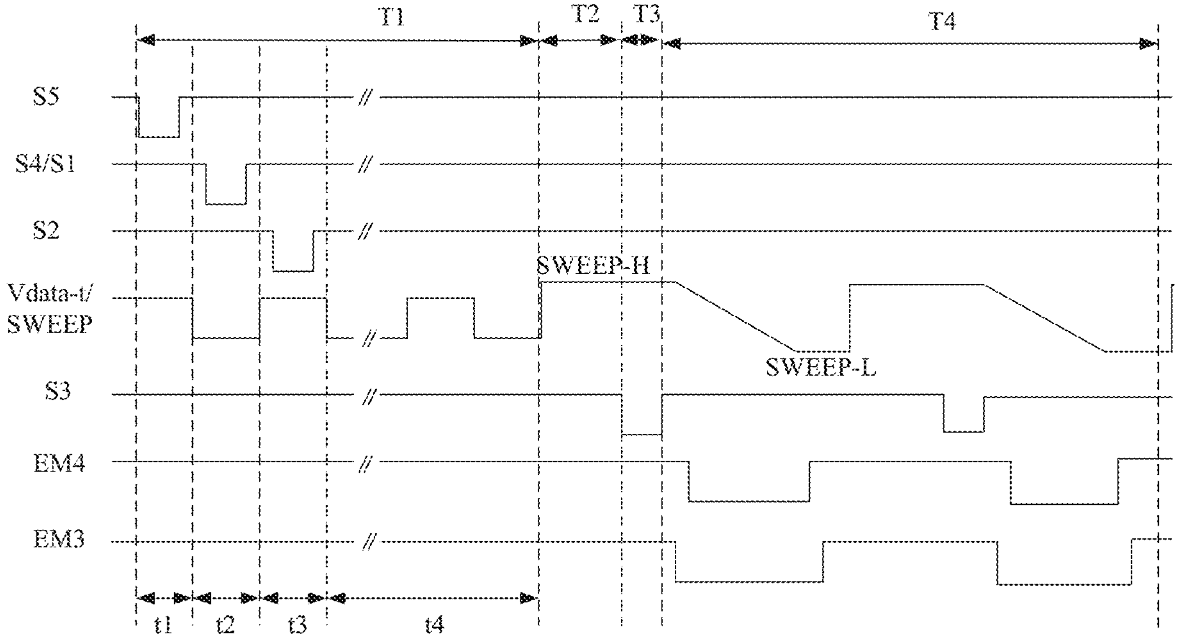
FIG. 12 is a timing graph of another pixel circuit according to an embodiment of the present application.

Optionally, the technical solutions provided in this embodiment may also implement the setting of data writing once and light emission multiple times in one frame, alleviating the problem of image flickering in a low grayscale. FIG. 12 is a timing graph of another pixel circuit according to an embodiment of the present application and may be applied to the pixel circuit shown in FIG. 10.

In this embodiment, the magnitude of the driving current is determined by the magnitude of the second data voltage Vdata_I and is not related to the threshold voltage Vth2 of the second drive transistor MD2, improving the chroma uniformity of the light emission circuit 30. The light emission time of the light emission circuit 30 is determined by the first data voltage Vdata_t and the sweep signal SWEEP. When the sweep signal SWEEP is at the logic high level, the light emission circuit 30 is in the bright state. In the scanning process of the sweep signal SWEEP from the high level to the low level, the voltage of the first electrode of the first capacitor C1 reduces gradually. Due to the coupling of the capacitor, the voltage of the gate of the first drive transistor MD1 reduces gradually. When the potential VG1 of the gate of the first drive transistor MD1 satisfies that VG1−VDD=Vth1, the first drive transistor MD1 is turned on, and the first power voltage VDD is transmitted to the gate of the fourth switch transistor M4. Therefore, the fourth switch transistor M4 is turned off. The light emission circuit 130 is in the dark state. Here within the light emission stage of one display frame, the sweep signal SWEEP includes a plurality of sub-signals. Each sub-signal corresponds to one light emission sub-stage. That is, in one display frame, the light emission stage includes a plurality of light emission sub-stages. The light emission circuit includes a bright state and a dark state in each light emission sub-stage. Each sub-signal of the sweep signal SWEEP repeats the preceding operation process. In this case, the slope of the signal SWEEP may be increased, improving the bright-and-dark switching speed of the light emission circuit 30, alleviating the problem of poor display caused by the excessively slow switching from the bright state of the light emission circuit to the dark state of the light emission circuit in a low grayscale. The sweep signal SWEEP may be a ramp signal such as a sawtooth wave signal or a triangular wave signal.

Figure 13:
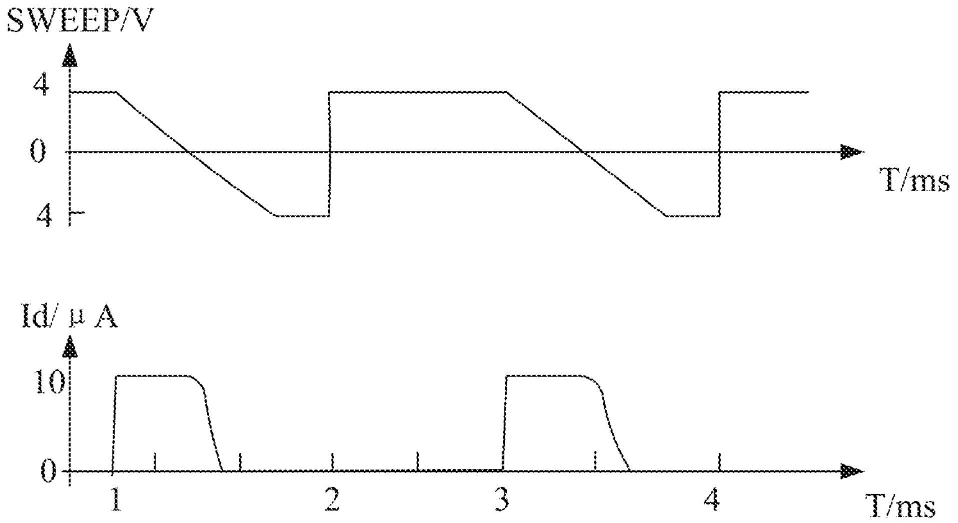
FIG. 13 is a simulation oscillogram of a light emission stage of the pixel circuit according to an embodiment of the present application.

Exemplarily, FIG. 13 is a simulation oscillogram of a light emission stage of the pixel circuit according to an embodiment of the present application. Referring to FIG. 13, the sweep signal SWEEP changes from 4V to −4V gradually in the scanning process. In the reduction process of the sweep signal SWEEP, the second drive transistor MD2 is turned off gradually, the driving current Id reduces to 0 gradually, and the light emission circuit 30 is turned off. In the rising process of the sweep signal SWEEP, the second drive transistor MD2 is turned on gradually, and the driving current Id increases gradually, driving the light emission circuit 30 to emit light normally.

Figure 14:
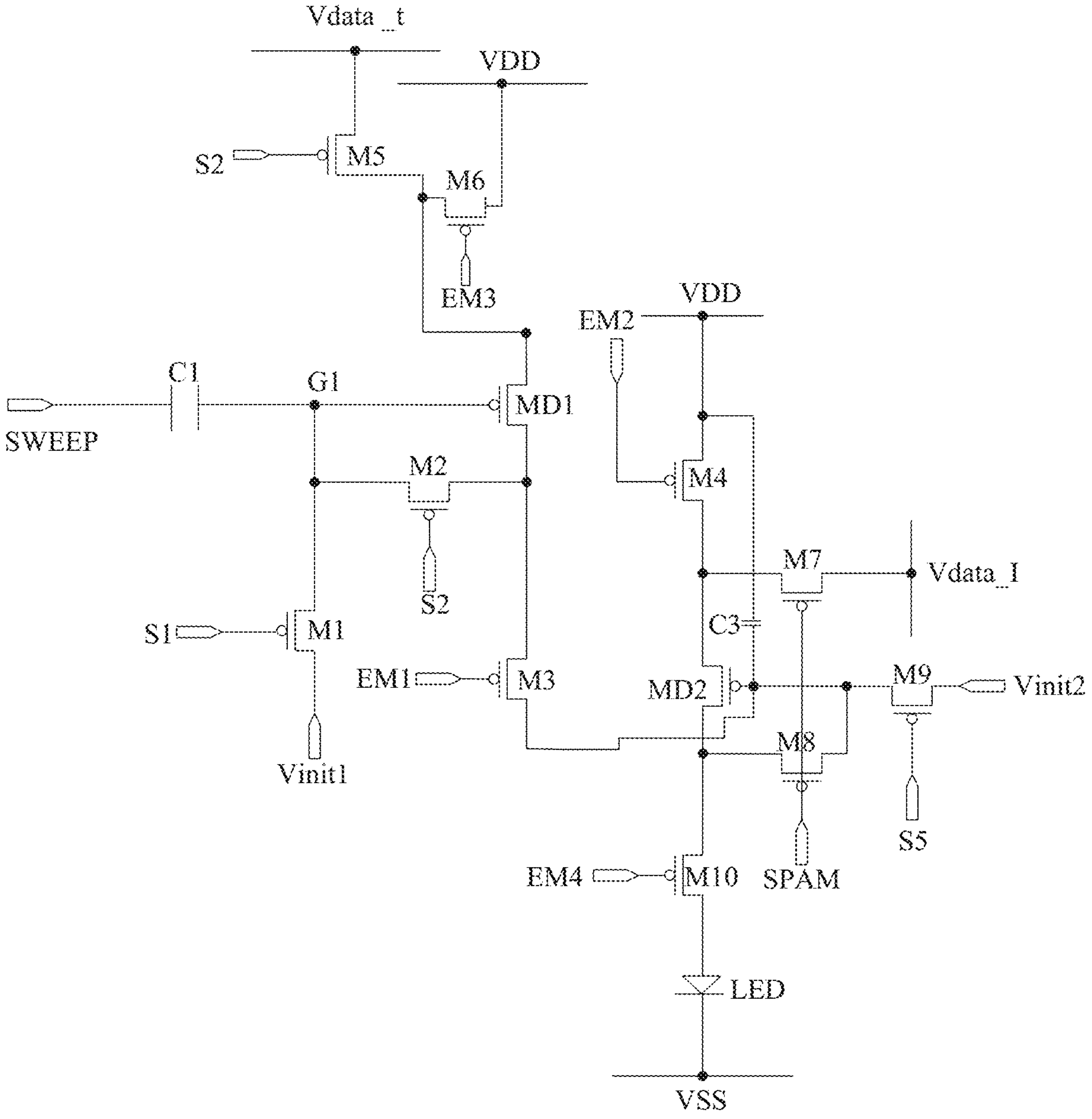
FIG. 14 is a structure diagram of another pixel circuit according to an embodiment of the present application.

FIG. 14 is a structure diagram of another pixel circuit according to an embodiment of the present application. For ease of comparison with the pixel circuit provided in this embodiment, the pixel circuit shown in FIG. 14 is a circuit structure obtained by adopting a Vdata-t input manner in the related art on the basis of this embodiment, which should not be understood as that the pixel circuit structure in FIG. 14 belongs to the related art.

TABLE 1

| Signal/Voltage | Positive-negative Driving/V | | Positive Driving/V | |
|---|---|---|---|---|
| Source | Related Art | This Embodiment | Related Art | This Embodiment |
| S-IC | 0.2-6 | 0.2-6 | 10.2-16 | 0.2-6 |
| Data-I | 0.2 | 0.2 | 4.8 | 4.8 |
| VDD | −1 | 4 | 9 | 9 |
| VSS | −10 | −5 | 0 | 0 |
| VGH | 9 | 8 | 19 | 13 |
| VGL | −9 | −9 | 1 | −4 |
| EMH | 4 | 8 | 14 | 13 |
| EML | −15 | −9 | −5 | −4 |

TABLE 2

| Attribution (Related Art) | Signal | Voltage Source | Attribution (This Embodiment) | Signal | Voltage Source |
|---|---|---|---|---|---|
| S-IC | Data-t | AVDD | S-IC | Data-t | AVDD |
| | SWEEP | | | SWEEP | |
| | Data-I | | | Data-I | |
| GOA | STV | VGH/VGL | GOA | STV | VGH/VGL |
| | CK1 | | | CK1 | |
| | CK2 | | | CK2 | |
| Global | EM | VEH/VEL | Global | EM | |
| | VST | VSH/VSL | | Set(S3) | |
| | SPAM | | | Vinit1 | Vinit1 |
| | Vinit1 | Vinit1 | | Vinit2 | Vinit2 |
| | Vinit2 | Vinit2 | EL | VDD | VDD |
| | VDDW | VDDW | | VSS | VSS |
| EL | VDD | VDD | / | / | / |
| | VSS | VSS | / | / | / |

The difference between the pixel circuit shown in FIG. 14 and the pixel circuit shown in FIG. 10 lies in that in FIG. 14, Vdata-t is directly written to the gate G1 of the first drive transistor MD1 and the first drive transistor MD1 is electrically connected to the second drive transistor MD2 so that the leakage current can flow from the gate G1 of the first drive transistor MID to the gate G2 of the second drive transistor MD2. Table 1 shows a comparison result of voltages required by the pixel circuit shown in FIG. 14 and voltages required by the pixel circuit shown in FIG. 10. Table 2 shows a comparison result of signals of the pixel circuit shown in FIG. 14 and signals of the pixel circuit shown in FIG. 10. It is to be noted that "the related art" in Table 1 and Table 2 refers to a solution in which Vdata-t is input through a manner in the related art.

From Table 1 and Table 2, the voltage span of the pixel voltage in the pixel circuit shown in FIG. 14 is around 24V (among various signal sources and voltage sources, the VGH signal has the maximum voltage and the EML signal has the minimum voltage), and the voltage span of the pixel voltage in this embodiment is around 17V. Compared with the signal input manner in the related art, the technical solutions provided by this embodiment can reduce the voltage span of the pixel voltage and reduce the types of global signals Global. Therefore, the light emission time control circuit 10 and the second drive circuit 202 are set independently and have no direct electrical connection so that the magnitude of the driving current is controlled by the second drive circuit 202 and the light emission time is controlled by the light emission time control circuit 10. The first data voltage Vdata_t is written to the gate G1 of the first drive transistor MD1 through the manner of capacitor coupling so that the on state of the first drive transistor MD1 does not need to be set according to the magnitude of the first data voltage Vdata_t. The first power voltage VDD may be set flexibly, simplifying the types of signals (for example, the types of global signals Global) and reducing the voltage span of the pixel voltage.

According to the data in Table 1, when the manner of positive voltage driving is used, the voltage of the pixel circuit shown in FIG. 14 is relatively high, causing a driver chip (e.g. S-IC) to be manufactured using the manufacturing process with a relatively high withstand voltage and increasing system costs. In the technical solutions of this embodiment, voltages under both positive voltage driving and positive-negative voltage driving are small. Therefore, positive voltage driving may be used in the technical solutions provided in the embodiment of the present application to improve the conversion efficiency of the pixel circuit. The driver chip is manufactured using the normal pressure process, making system costs relatively low. Referring to Table 2, the pixel circuit shown in FIG. 14 needs to use 12 groups of voltage sources. In the technical solutions of this embodiment, merely 7 groups of voltage sources are needed, greatly reducing the number of voltage sources. Moreover, a relatively small number of external control signals simplify the difficulty of layout design.

Figure 15:
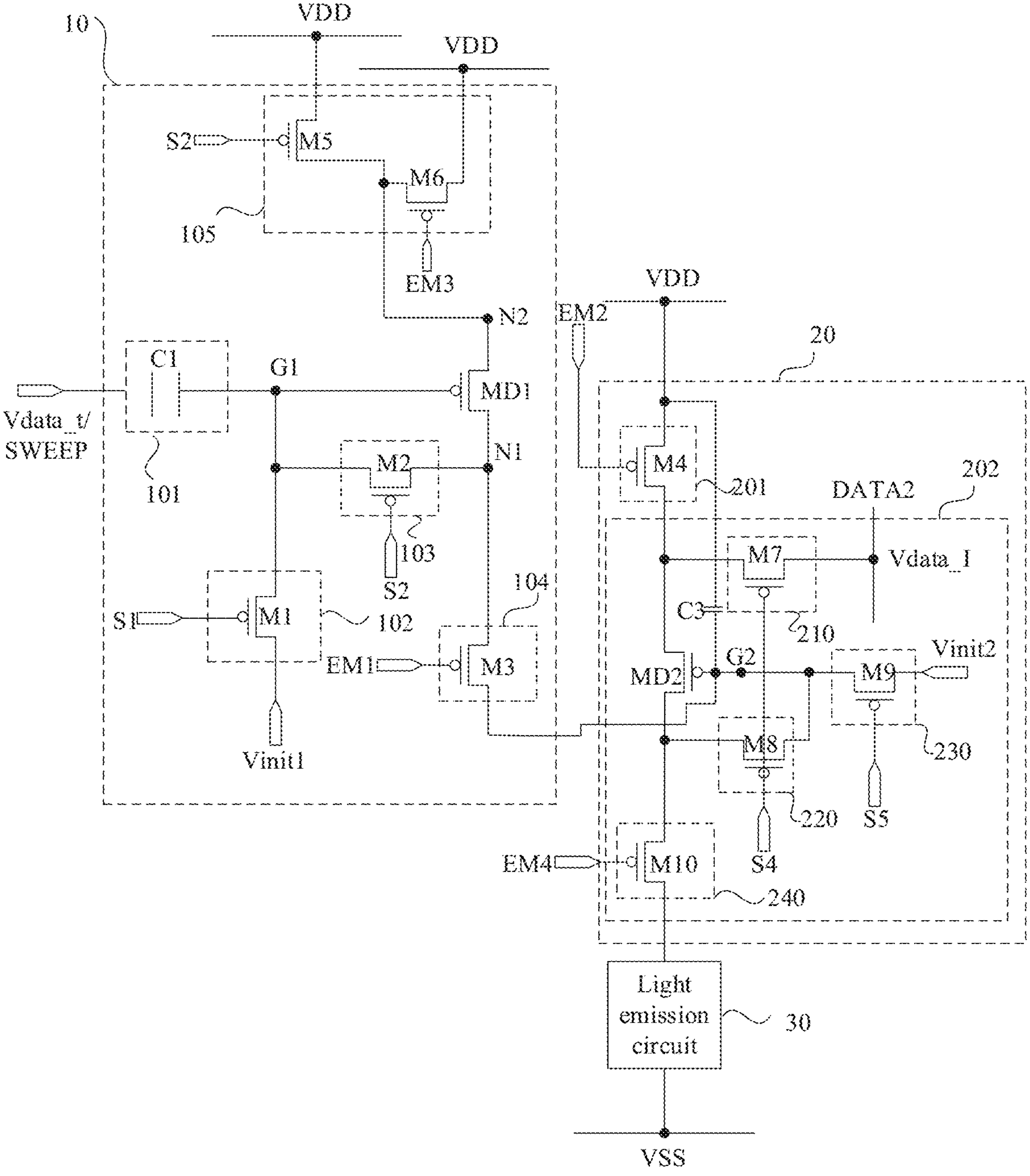
FIG. 15 is a structure diagram of another pixel circuit according to an embodiment of the present application.
Figure 16:
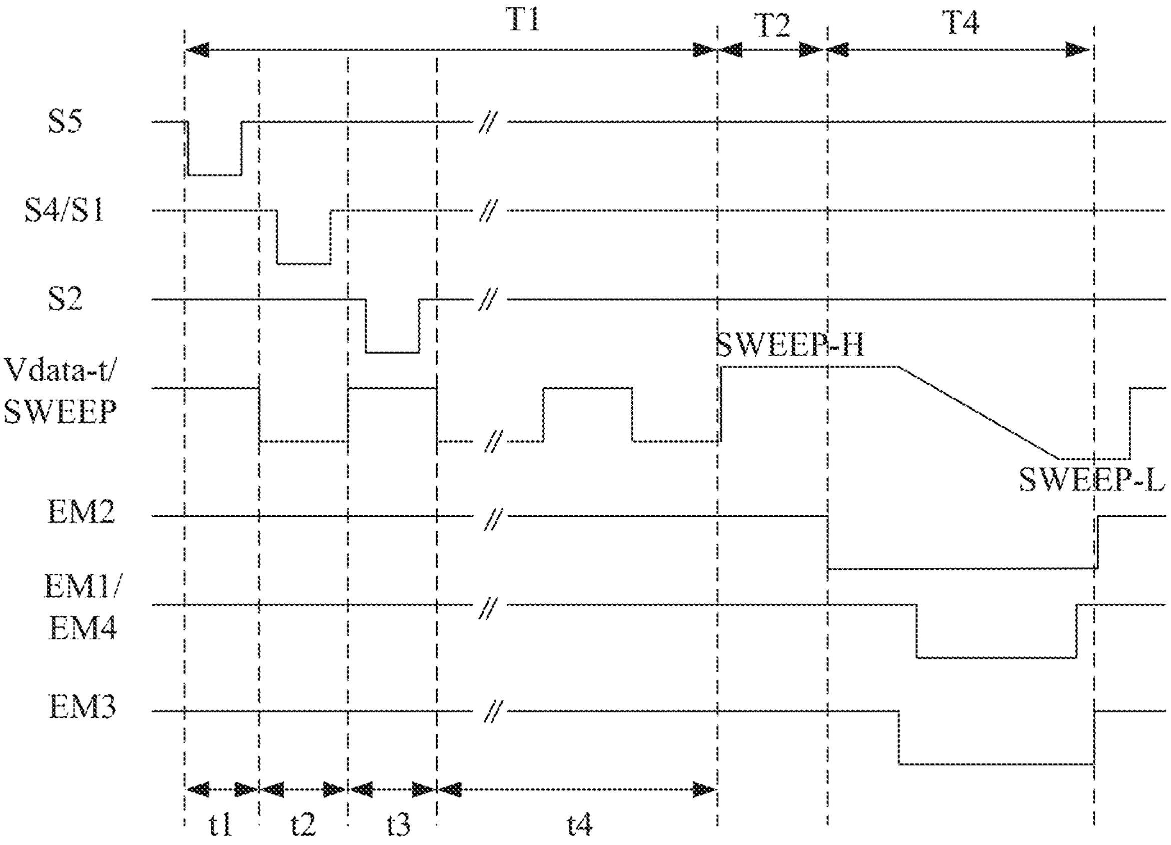
FIG. 16 is a timing graph of another pixel circuit according to an embodiment of the present application.

Optionally, FIG. 15 is a structure diagram of another pixel circuit according to an embodiment of the present application and exemplarily shows the structure in which the first drive transistor MD1 is directly electrically connected to the gate G2 of the second drive transistor MD2. FIG. 16 is a timing graph of another pixel circuit according to an embodiment of the present application and may apply to the pixel circuit shown in FIG. 15. Referring to FIGS. 15 and 16, the operating process of the pixel circuit provided in the embodiment of the present application includes at least the voltage write stage T1, the voltage normalization stage T2, and the light emission stage T4. The voltage write stage T1 includes a plurality of sub-stages.

The operating process of the first sub-stage t1, the second sub-stage t2, the third sub-stage t3, the fourth sub-stage t4, and the voltage normalization stage T2 is the same as the operating process of the pixel circuit shown in FIG. 10 and is not repeated here.

At the light emission stage T4, the first light emission control signal line is configured to transmit the first light emission control signal EM1 at logic low-level, the second light emission control signal line is configured to transmit the second light emission control signal EM2 at logic low-level, the third light emission control signal line is configured to transmit the third light emission control signal EM3 at logic low-level, and the fourth light emission control signal line is configured to transmit the fourth light emission control signal EM4 at logic low-level. In this case, the sixth switch transistor M6, the third switch transistor M3, the fourth switch transistor M4, and the tenth switch transistor M10 are turned on. The second drive transistor MD2 generates the driving current according to the first power voltage VDD and the second data voltage Vdata_I (stored on the third capacitor C3) to drive the light emission circuit 30 to emit light. Moreover, the sweep signal SWEEP changes from the high level SWEEP-H to the low level SWEEP-L gradually.

Due to the coupling of the first capacitor C1, the potential of the gate of the first drive transistor MD1 changes synchronously. When the sweep signal reduces to enable the potential VG1 of the gate of the first drive transistor MD1 to satisfy that VG1−VDD=Vth1, the first drive transistor MD1 is turned on. The first power voltage VDD is transmitted to the gate G2 of the second drive transistor MD2 through the sixth switch transistor M6, the first drive transistor MD1, and the third switch transistor M3 to heighten the potential of the gate of the second drive transistor MD2. The second drive transistor MD2 is turned off. The driving current is zero. The light emission circuit 30 is turned off.

In any embodiment provided in the present application, the turning-on duration of the sixth switch transistor M6 may be greater than or equal to the turning-on duration of the tenth switch transistor M10, enabling the light emission time control circuit 10 to accurately control the light emission time of the light emission circuit 30.

In any preceding embodiment, the first data voltage Vdata_t is written to the gate G1 of the first drive transistor MD1 through the manner of capacitor coupling, thus having no requirements on the difference between the first data voltage Vdata_t and the first power voltage VDD. That is, the first power voltage VDD connected to the second electrode N2 of the first drive transistor MD1 does not need to vary with the first data voltage Vdata_t. The normal operation of the light emission time control circuit 10 has no relationship with the magnitude of the first power voltage VDD. In this case, the same group of first data voltages Vdata_t may correspond to different first power voltage VDD, improving the flexibility of the voltage corresponding to the pixel circuit.

Figure 17:
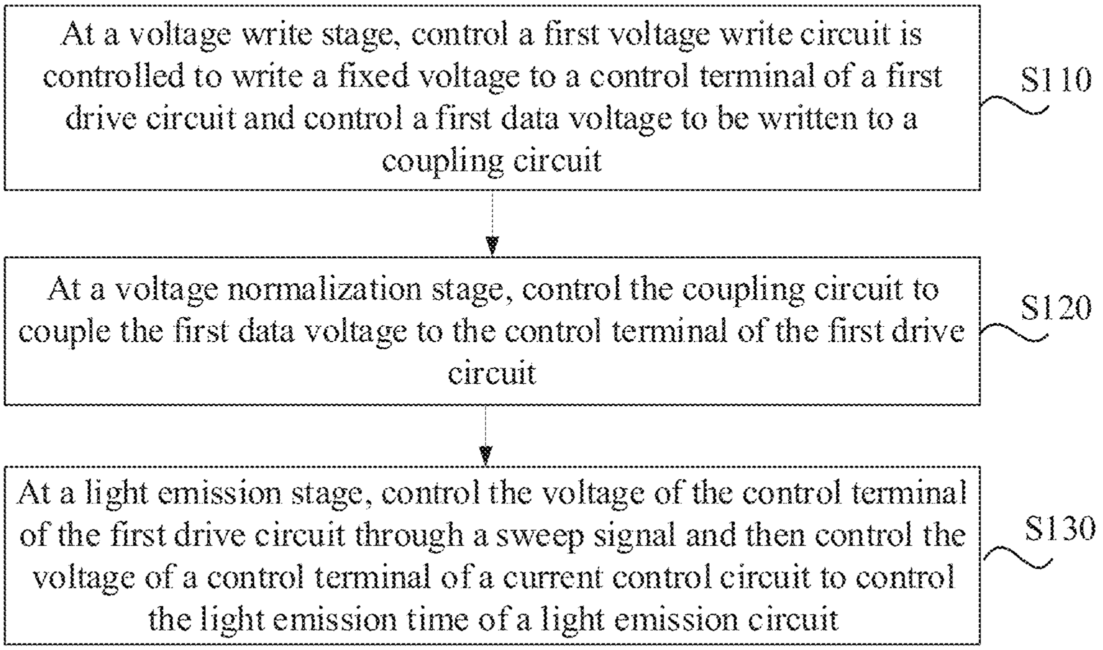
FIG. 17 is a flowchart of a driving method of a pixel circuit according to an embodiment of the present application.

An embodiment of the present application further provides a driving method of a pixel circuit applied to the pixel circuit provided in any preceding embodiment. Referring to FIG. 1, the pixel circuit includes the light emission time control circuit 10, the current control circuit 20, and the light emission circuit 30. The light emission time control circuit 10 includes the first drive circuit 106, the coupling circuit 101, and the first voltage write circuit 102. The coupling circuit 101 is connected to the control terminal of the first drive circuit 106. The control terminal of the current control circuit 20 is connected to the output terminal of the light emission time control circuit 10. The output terminal of the current control circuit 20 is connected to the light emission circuit 30. FIG. 17 is a flowchart of a driving method of a pixel circuit according to an embodiment of the present application. The driving method includes the following.

In S110, at the voltage write stage, the first voltage write circuit is controlled to write the fixed voltage to the control terminal of the first drive circuit, and the first data voltage is controlled to be written to the coupling circuit.

In S120, at the voltage normalization stage, the coupling circuit is controlled to couple the first data voltage to the control terminal of the first drive circuit.

In S130, at the light emission stage, the voltage of the control terminal of the first drive circuit is controlled through the sweep signal, and then the voltage of the control terminal of the current control circuit is controlled to control the light emission time of the light emission circuit.

According to the technical solutions provided in embodiments of the present application, the current control circuit generates the driving current to drive the light emission circuit to emit light. The light emission time control circuit controls the voltage of the control terminal of the current control circuit to control the turning-on time of the current control circuit, thereby controlling the light emission time of the light emission circuit. In the technical solutions in the related art, to guarantee that various transistors are turned on and off normally, various control signals need to be set according to corresponding data signals, and a data voltage needs to be greater than a power voltage. In comparison, in the technical solutions provided in embodiments of the present application, the first data voltage is written to the gate of the first drive transistor indirectly through the coupling circuit so that the on state of the first drive transistor does not need to be set according to the magnitude of the first data voltage. With no requirements on the magnitude of the voltage between the first data voltage and the power voltage (for example, the first power voltage) connected to the second electrode of the first drive transistor, the first power voltage VDD can be set flexibly, thus reducing the voltage span of the pixel voltage, thereby reducing a bias voltage applied to an element, and improving the reliability of the pixel circuit.

Figure 18:
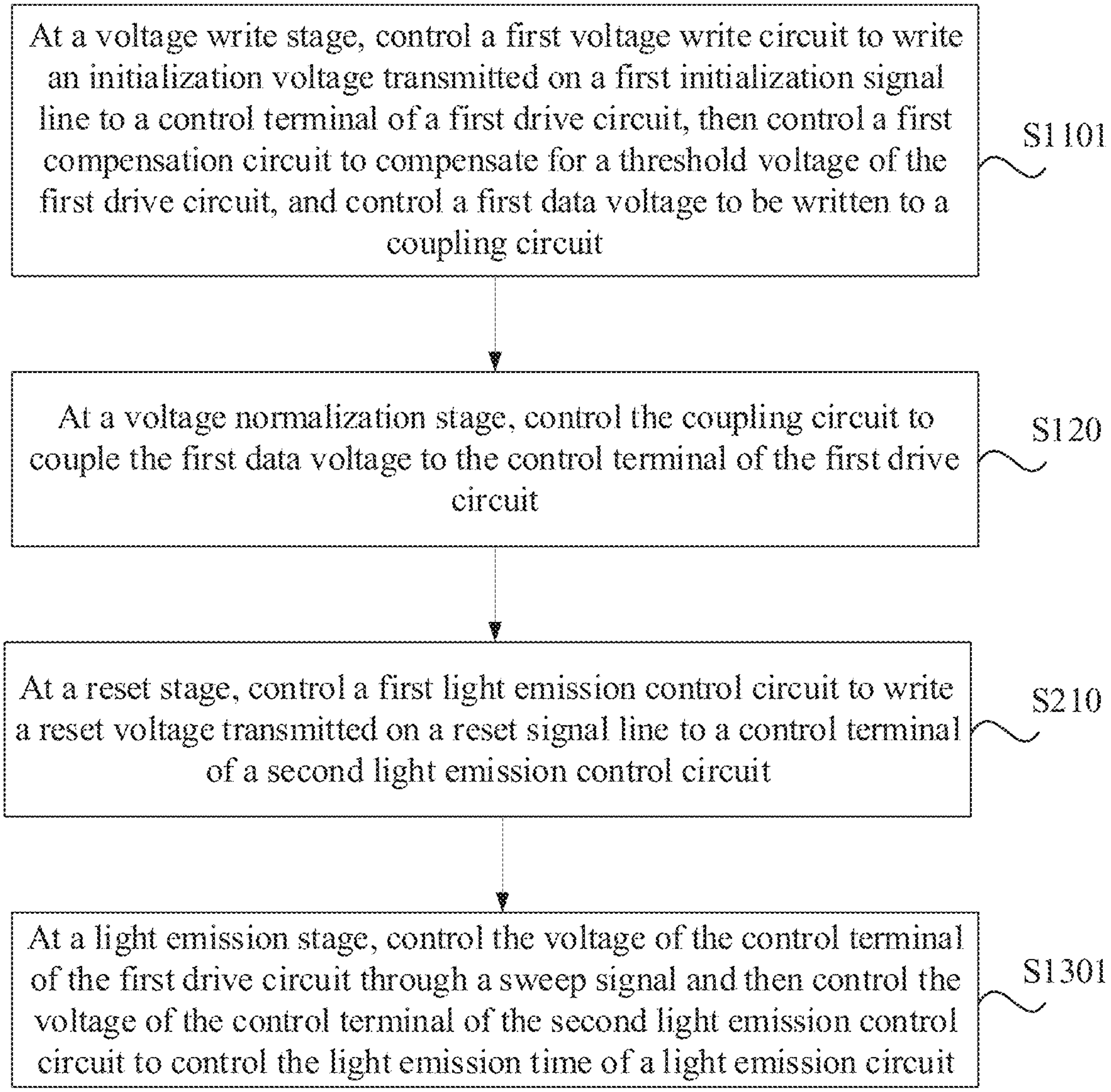
FIG. 18 is a flowchart of the driving method of another pixel circuit according to an embodiment of the present application.

FIG. 18 is a flowchart of the driving method of another pixel circuit according to an embodiment of the present application. On the basis of the preceding technical solutions, the driving method of a pixel circuit provided in this embodiment includes the following.

In S1101, at the voltage write stage, the first voltage write circuit is controlled to write an initialization voltage transmitted on the first initialization signal line to the control terminal of the first drive circuit, then the first compensation circuit is controlled to compensate for the threshold voltage of the first drive circuit, and the first data voltage is controlled to be written to the coupling circuit.

In S120, at the voltage normalization stage, the coupling circuit is controlled to couple the first data voltage to the control terminal of the first drive circuit.

In S210, at the reset stage, the first light emission control circuit is controlled to write the reset voltage transmitted on the reset signal line to the control terminal of the second light emission control circuit.

In S1301, at the light emission stage, the voltage of the control terminal of the first drive circuit is controlled through the sweep signal, and then the voltage of the control terminal of the second light emission control circuit is controlled to control the light emission time of the light emission circuit.

The driving method of a pixel circuit shown in FIG. 18 may be applied to the pixel circuit shown in FIG. 10. For the working principle of the pixel circuit, reference may be made to the preceding embodiments and is not repeated here.

Figure 19:
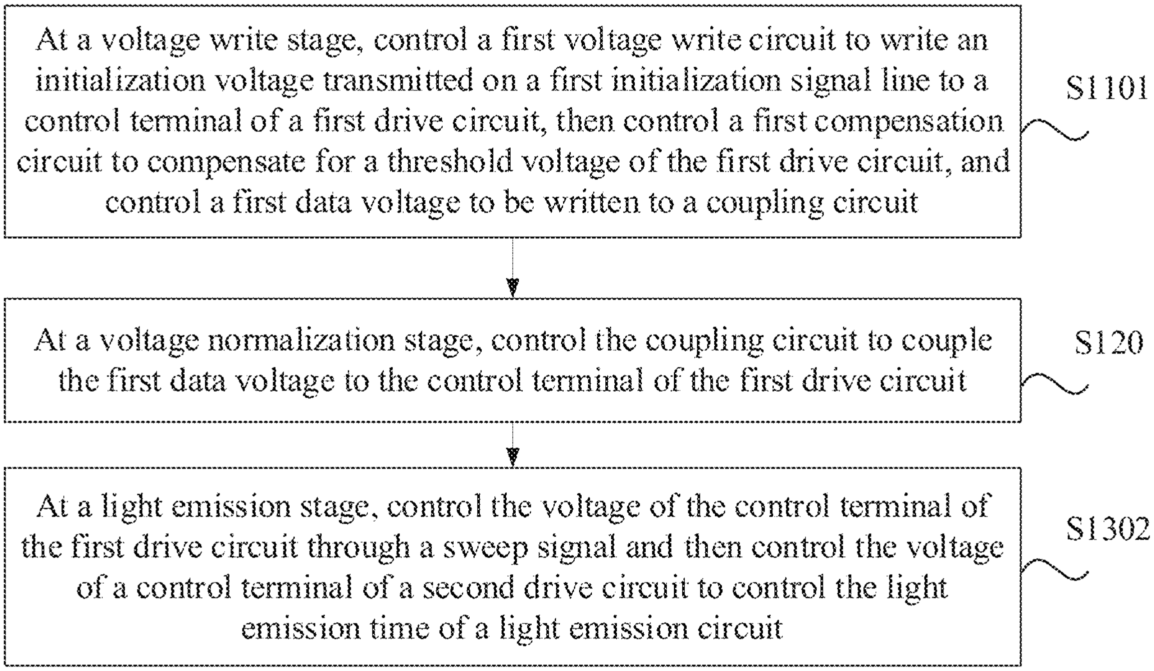
FIG. 19 is a flowchart of the driving method of another pixel circuit according to an embodiment of the present application.

FIG. 19 is a flowchart of the driving method of another pixel circuit according to an embodiment of the present application. On the basis of the preceding technical solutions, the driving method of a pixel circuit provided in this embodiment includes the following.

In S1101, at the voltage write stage, the first voltage write circuit is controlled to write an initialization voltage transmitted on the first initialization signal line to the control terminal of the first drive circuit, then the first compensation circuit is controlled to compensate for the threshold voltage of the first drive circuit, and the first data voltage is controlled to be written to the coupling circuit.

In S120, at the voltage normalization stage, the coupling circuit is controlled to couple the first data voltage to the control terminal of the first drive circuit.

In S1302, at the light emission stage, the voltage of the control terminal of the first drive circuit is controlled through the sweep signal, and then the voltage of the control terminal of the second drive circuit is controlled to control the light emission time of the light emission circuit.

The driving method of a pixel circuit shown in FIG. 19 may be applied to the pixel circuit shown in FIG. 15. For the working principle of the pixel circuit, reference may be made to the preceding embodiments and is not repeated here.

Figure 20:
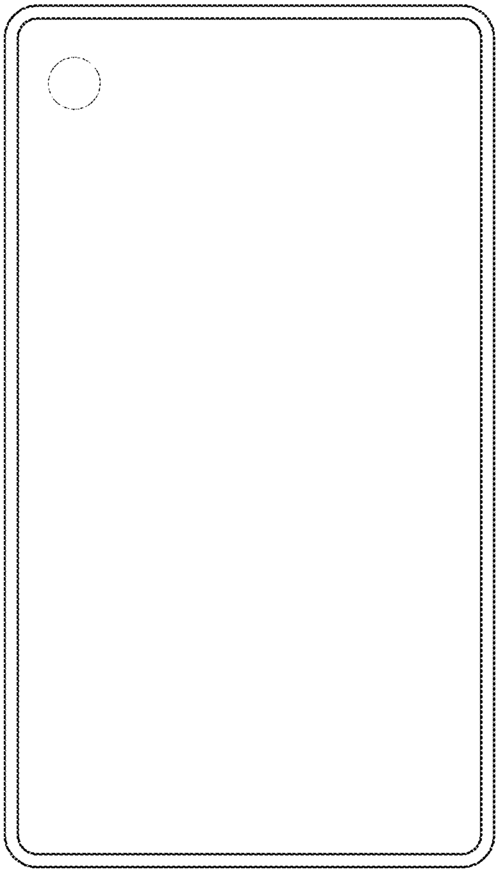
FIG. 20 is a structure diagram of a display device according to an embodiment of the present application.

Optionally, an embodiment of the present application further provides a display device. The display device includes the pixel circuit provided in any embodiment of the present application. FIG. 20 is a structure diagram of a display device according to an embodiment of the present application. The display device may be not only a mobile phone shown in FIG. 20 but also an electronic device such as a tablet, a mobile phone, a watch, a wearable device, an in-vehicle display, a camera display, a television, and a computer screen.

It is to be understood that various forms of processes shown above may be adopted with steps reordered, added or deleted. For example, the steps described in the present application may be performed in parallel, sequentially or in different sequences, as long as the desired results of the technical solutions of the present application can be achieved, and no limitation is imposed herein.

What is claimed is:

1. A pixel circuit, comprising a light emission time control circuit, a current control circuit, and a light emission circuit;

wherein the light emission time control circuit comprises a first drive circuit, a coupling circuit, and a first voltage write circuit;

the first voltage write circuit is configured to transmit a fixed voltage to a control terminal of the first drive circuit, the coupling circuit is configured to couple a first data voltage and a sweep signal to the control terminal of the first drive circuit, and a control voltage is outputted from a first terminal of the first drive circuit outputs to a control terminal of the current control circuit to control a voltage of the control terminal of the current control circuit according to the first data voltage and the sweep signal to control light emission time of the light emission circuit;

wherein an output terminal of the current control circuit is connected to the light emission circuit, and the current control circuit is configured to drive the light emission circuit to emit light at a light emission stage according to the voltage of the control terminal of the current control circuit and a voltage of an input terminal of the current control circuit; and wherein the first terminal of the first drive circuit serves as an output terminal of the light emission time control circuit, the light emission time control circuit further comprises a first light emission control circuit, the current control circuit comprises a second light emission control circuit and a second drive circuit, a control terminal of the second light emission control circuit serves as the control terminal of the current control circuit to be connected to the first terminal of the first drive circuit, and the first light emission control circuit is configured to control the second light emission control circuit to be turned on at a reset stage.

2. The pixel circuit according to claim 1, wherein a first terminal of the coupling circuit is connected to a first data line, an output terminal of the coupling circuit is connected to the control terminal of the first drive circuit, and the first data voltage and the sweep signal share the first data line; or the first terminal of the coupling circuit is connected to the first data line, a second terminal of the coupling circuit is connected to a sweep signal line, and the output terminal of the coupling circuit is connected to the control terminal of the first drive circuit.

3. The pixel circuit according to claim 2, wherein the coupling circuit comprises a first capacitor, a first terminal of the first capacitor serves as the first terminal of the coupling circuit to be connected to the first data line, and a second terminal of the first capacitor is connected to the control terminal of the first drive circuit; or the coupling circuit comprises the first capacitor and a second capacitor, the first terminal of the first capacitor serves as the first terminal of the coupling circuit to be connected to the first data line, the second terminal of the first capacitor is connected to the control terminal of the first drive circuit, a first terminal of the second capacitor serves as the second terminal of the coupling circuit to be connected to the sweep signal line, and a second terminal of the second capacitor is connected to the control terminal of the first drive circuit.

4. The pixel circuit according to claim 1, wherein the first voltage write circuit comprises a first switch transistor, a gate of the first switch transistor is connected to a first scanning signal line, a first electrode of the first switch transistor is connected to a first power line, and a second electrode of the first switch transistor is connected to the control terminal of the first drive circuit.

5. The pixel circuit according to claim 1, wherein the light emission time control circuit further comprises a first compensation circuit, and the first compensation circuit is connected between the first terminal of the first drive circuit and the control terminal of the first drive circuit;

the first drive circuit comprises a first drive transistor, a gate of the first drive transistor serves as the control terminal of the first drive circuit, the first voltage write circuit comprises a first switch transistor, the first compensation circuit comprises a second switch transistor; and a gate of the first switch transistor is connected to a first scanning signal line, a first electrode of the first switch transistor is connected to a first initialization signal line, a second electrode of the first switch transistor is connected to the gate of the first drive transistor, a gate of the second switch transistor is connected to a second scanning signal line, a first electrode of the second switch transistor is connected to a first electrode of the first drive transistor, a second electrode of the second switch transistor is connected to the gate of the first drive transistor, and a second electrode of the first drive transistor is connected to a first power line.

6. The pixel circuit according to claim 1, wherein the second drive circuit comprises a second drive transistor and a second voltage write circuit;

a first electrode of the second drive transistor is connected to an output terminal of the second light emission control circuit, an input terminal of the second light emission control circuit is connected to a first power line, the second voltage write circuit is configured to transmit a second data voltage to a gate of the second drive transistor, and the second drive transistor is configured to drive, according to a voltage of the gate of the second drive transistor and a voltage of the first electrode of the second drive transistor, the light emission circuit to emit light.

7. The pixel circuit according to claim 6, wherein the first light emission control circuit comprises a third switch transistor, and the second light emission control circuit comprises a fourth switch transistor; and a gate of the third switch transistor is connected to a third scanning signal line, a first electrode of the third switch transistor is connected to a reset signal line, a second electrode of the third switch transistor is connected to the first terminal of the first drive circuit, a gate of the fourth switch transistor is connected to the first terminal of the first drive circuit, a first electrode of the fourth switch transistor is connected to the first power line, and a second electrode of the fourth switch transistor is connected to the first electrode of the second drive transistor.

8. The pixel circuit according to claim 7, wherein the second drive circuit further comprises a storage circuit, a second compensation circuit, an initialization circuit, and a third light emission control circuit;

the storage circuit comprises a third capacitor, the second voltage write circuit comprises a seventh switch transistor, the second compensation circuit comprises an eighth switch transistor, the initialization circuit comprises a ninth switch transistor, and the third light emission control circuit comprises a tenth switch transistor;

the third capacitor is connected between the gate of the second drive transistor and the first power line, each of a gate of the seventh switch transistor and a gate of the eighth switch transistor are connected to a fourth scanning signal line, a first electrode of the seventh switch transistor is connected to a second data line, a second electrode of the seventh switch transistor is connected to a first electrode of the second drive transistor;

a first electrode of the eighth switch transistor is connected to the gate of the second drive transistor, a second electrode of the eighth switch transistor is connected to a second electrode of the second drive transistor, a gate of the ninth switch transistor is connected to a fifth scanning signal line, a first electrode of the ninth switch transistor is connected to a second initialization signal line, a second electrode of the ninth switch transistor is connected to the gate of the second drive transistor; and a gate of the tenth switch transistor is connected to a fourth light emission control signal line, a first electrode of the tenth switch transistor is connected to the second electrode of the second drive transistor, a second electrode of the tenth switch transistor is connected to a first terminal of the light emission circuit, and a second terminal of the light emission circuit is connected to a second power line.

9. The pixel circuit according to claim 8, wherein a control terminal of the first voltage write circuit is connected to a first scanning signal line; and when the first light emission control circuit is connected to a third scanning signal line, the first scanning signal line, the third scanning signal line, the fourth scanning signal line, the fifth scanning signal line, and the fourth light emission control signal line are configured to transmit driving signals to satisfy the following:

the initialization circuit is turned on at an initialization stage;

the first voltage write circuit, the second voltage write circuit, and the second compensation circuit are turned on at a second voltage write stage;

the first data voltage is written to a first terminal of the coupling circuit at a first voltage write stage;

the first light emission control circuit and the second light emission control circuit are turned on at a reset stage; and the third light emission control circuit is turned on at a light emission stage; or when the first light emission control circuit is connected to the first light emission control signal line, the first scanning signal line, the first light emission control signal line, the fourth scanning signal line, the fifth scanning signal line, the second light emission control signal line, and the fourth light emission control signal line are configured to transmit driving signals to satisfy the following:

the initialization circuit is turned on at the initialization stage;

the first voltage write circuit, the second voltage write circuit, and the second compensation circuit are turned on at the second voltage write stage;

the first data voltage is written to the first terminal of the coupling circuit at the first voltage write stage; and the first light emission control circuit, the second light emission control circuit, and the third light emission control circuit are turned on at the light emission stage.

10. The pixel circuit according to claim 1, wherein a second terminal of the first light emission control circuit serves as an output terminal of the light emission time control circuit, a control terminal of the second drive circuit serves as the control terminal of the current control circuit, the second terminal of the first light emission control circuit is connected to the control terminal of the second drive circuit, and a first terminal of the first light emission control circuit is connected to the first terminal of the first drive circuit;

the first light emission control circuit comprises a third switch transistor, the second light emission control circuit comprises a fourth switch transistor, and the second drive circuit comprises a second drive transistor and a second voltage write circuit; and wherein a gate of the third switch transistor is connected to a first light emission control signal line, a first electrode of the third switch transistor is connected to the first terminal of the first drive circuit, a second electrode of the third switch transistor is connected to a gate of the second drive transistor, the second drive transistor is connected between a second electrode of the fourth switch transistor and the light emission circuit, a first electrode of the fourth switch transistor is connected to a first power line, a gate of the fourth switch transistor is connected to a second light emission control signal line, and the second voltage write circuit is configured to transmit a second data voltage to the gate of the second drive transistor.

11. The pixel circuit according to claim 1, wherein the light emission time control circuit further comprises a third voltage write circuit, and the third voltage write circuit is connected between a second terminal of the first drive circuit and a first power line to transmit a first power voltage on the first power line to the second terminal of the first drive circuit; and the third voltage write circuit comprises a fifth switch transistor and a sixth switch transistor, a gate of the fifth switch transistor is connected to a second scanning signal line, a first electrode of the fifth switch transistor is connected to the first power line, a second electrode of the fifth switch transistor is connected to the second terminal of the first drive circuit, a gate of the sixth switch transistor is connected to a third light emission control signal line, a first electrode of the sixth switch transistor is connected to the first power line, and a second electrode of the sixth switch transistor is connected to the second terminal of the first drive circuit.

12. A display device, comprising: a display panel according to claim 1, and a light emission time control circuit, a current control circuit, and a light emission circuit;

wherein the light emission time control circuit comprises a first drive circuit, a coupling circuit, and a first voltage write circuit;

the first voltage write circuit is configured to transmit a fixed voltage to a control terminal of the first drive circuit, the coupling circuit is configured to couple a first data voltage and a sweep signal to the control terminal of the first drive circuit, and a control voltage is outputted from a first terminal of the first drive circuit outputs to a control terminal of the current control circuit to control a voltage of the control terminal of the current control circuit according to the first data voltage and the sweep signal to control light emission time of the light emission circuit; and wherein an output terminal of the current control circuit is connected to the light emission circuit, and the current control circuit is configured to drive the light emission circuit to emit light at a light emission stage according to the voltage of the control terminal of the current control circuit and a voltage of an input terminal of the current control circuit.

13. A driving method of a pixel circuit, wherein the pixel circuit comprises a light emission time control circuit, a current control circuit, and a light emission circuit;

the light emission time control circuit comprises a first drive circuit, a coupling circuit, and a first voltage write circuit;

wherein the coupling circuit is connected to a control terminal of the first drive circuit, a control terminal of the current control circuit is connected to an output terminal of the light emission time control circuit, and an output terminal of the current control circuit is connected to the light emission circuit; and the driving method of the pixel circuit comprises:

at a voltage write stage, controlling the first voltage write circuit to write a fixed voltage to the control terminal of the first drive circuit and controlling a first data voltage to be written to the coupling circuit;

at a voltage normalization stage, controlling the coupling circuit to couple the first data voltage to the control terminal of the first drive circuit;

at a light emission stage, controlling a voltage of the control terminal of the first drive circuit through a sweep signal and then controlling a voltage of the control terminal of the current control circuit to control light emission time of the light emission circuit; and wherein the first voltage write circuit is connected between a first initialization signal line and the control terminal of the first drive circuit, the light emission time control circuit further comprises a first compensation circuit and a first light emission control circuit;

the first compensation circuit is connected between a first terminal of the first drive circuit and the control terminal of the first drive circuit, the first light emission control circuit is connected between a reset signal line and the first terminal of the first drive circuit, the first terminal of the first drive circuit serves as the output terminal of the light emission time control circuit;

the current control circuit comprises a second light emission control circuit and a second drive circuit, the second drive circuit is connected between the second light emission control circuit and the light emission circuit, and a control terminal of the second light emission control circuit serves as the control terminal of current control circuit to be connected to the first terminal of the first drive circuit; and at the voltage write stage, controlling the first voltage write circuit to write the fixed voltage to the control terminal of the first drive circuit.

14. The driving method of a pixel circuit according to claim 13, wherein controlling the first data voltage to be written to the coupling circuit comprises:

at the voltage write stage, controlling the first voltage write circuit to write an initialization voltage transmitted on the first initialization signal line to the control terminal of the first drive circuit, then controlling the first compensation circuit to compensate for a threshold voltage of the first drive circuit, and controlling the first data voltage to be written to the coupling circuit.

15. The driving method of a pixel circuit according to claim 14, wherein at the light emission stage, controlling the voltage of the control terminal of the first drive circuit through the sweep signal and then controlling the voltage of the control terminal of current control circuit to control the light emission time of the light emission circuit comprises:

at the light emission stage, controlling the voltage of the control terminal of the first drive circuit through the sweep signal and then controlling a voltage of the control terminal of the second light emission control circuit to control the light emission time of the light emission circuit.

16. The driving method of a pixel circuit according to claim 14, after the voltage normalization stage, further comprising:

at a reset stage, controlling the first light emission control circuit to write a reset voltage transmitted on the reset signal line to the control terminal of the second light emission control circuit.

17. The driving method of a pixel circuit according to claim 14, wherein in a display frame, the light emission stage comprises a plurality of light emission sub-stages; the sweep signal comprises a plurality of sub-signals; each of the plurality of sub-signals corresponds to one of the plurality of light emission sub-stages; and the light emission circuit comprises a bright state and a dark state in each of the plurality of light emission sub-stages.

18. The driving method of a pixel circuit according to claim 13, wherein the first voltage write circuit is connected between a first initialization signal line and the control terminal of the first drive circuit, the light emission time control circuit further comprises a first compensation circuit and a first light emission control circuit, the first compensation circuit is connected between a first terminal of the first drive circuit and the control terminal of the first drive circuit;

the current control circuit comprises a second light emission control circuit and a second drive circuit, the second drive circuit is connected between the second light emission control circuit and the light emission circuit, a control terminal of the second drive circuit serves as the control terminal of the current control circuit to be connected to a second electrode of the first light emission control circuit, and a first electrode of the first light emission control circuit is connected to the first terminal of the first drive circuit; and wherein at the voltage write stage, controlling the first voltage write circuit to write the fixed voltage to the control terminal of the first drive circuit and controlling the first data voltage to be written to the coupling circuit comprises:

at the voltage write stage, controlling the first voltage write circuit to write an initialization voltage transmitted on the first initialization signal line to the control terminal of the first drive circuit, then controlling the first compensation circuit to compensate for a threshold voltage of the first drive circuit, and controlling the first data voltage to be written to the coupling circuit.

19. The driving method of a pixel circuit according to claim 18, wherein at the light emission stage, controlling the voltage of the control terminal of the first drive circuit through the sweep signal and then controlling the voltage of the control terminal of current control circuit to control the light emission time of the light emission circuit comprises:

at the light emission stage, controlling the voltage of the control terminal of the first drive circuit through the sweep signal and then controlling a voltage of the control terminal of the second drive circuit to control the light emission time of the light emission circuit.

* * * * *